(12) United States Patent
Morimoto et al.

(10) Patent No.: US 9,900,457 B2
(45) Date of Patent: Feb. 20, 2018

(54) IMAGE FORMING APPARATUS

(71) Applicant: Sharp Kabushiki Kaisha, Sakai, Osaka (JP)

(72) Inventors: Yasumasa Morimoto, Sakai (JP); Hideyuki Hiro, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/292,388

(22) Filed: Oct. 13, 2016

(65) Prior Publication Data
US 2017/0111535 A1    Apr. 20, 2017

(30) Foreign Application Priority Data
Oct. 14, 2015   (JP) ................. 2015-203170

(51) Int. Cl.
*G06F 15/00* (2006.01)
*H04N 1/00* (2006.01)

(52) U.S. Cl.
CPC ..... *H04N 1/00896* (2013.01); *H04N 1/00007* (2013.01); *H04N 1/00037* (2013.01); *H04N 1/00058* (2013.01); *H04N 1/00082* (2013.01); *H04N 1/00551* (2013.01); *H04N 1/00602* (2013.01); *H04N 1/00891* (2013.01); *H04N 2201/0094* (2013.01)

(58) Field of Classification Search
CPC .......... H04N 1/00896; H04N 1/00891; H04N 1/00602; H04N 1/00551; H04N 2201/0094; H04N 1/00037; H04N 1/00058; H04N 1/00082

USPC ............................... 358/1.13–1.15
See application file for complete search history.

(56) References Cited

U.S. PATENT DOCUMENTS

| 8,294,910 | B2* | 10/2012 | Hirai | H04N 1/00708 347/104 |
|---|---|---|---|---|
| 8,355,640 | B2 | 1/2013 | Tabuchi | |
| 8,773,672 | B2* | 7/2014 | Inaba | H04N 1/00681 358/1.1 |
| 8,934,801 | B2* | 1/2015 | Saito | G03G 15/5004 399/70 |

(Continued)

FOREIGN PATENT DOCUMENTS

JP    2012-95242    5/2012

*Primary Examiner* — Saeid Ebrahimi Dehkordy
(74) *Attorney, Agent, or Firm* — Keating & Bennett, LLP

(57) ABSTRACT

An image forming apparatus has a power-saving mode in which the image forming apparatus is switched from a normal power consumption state to a low power consumption state where less energy is supplied than in the normal power consumption state. This image forming apparatus includes a detection unit configured to detect an operating state of the image forming apparatus, and a memory unit configured to store a detection result by the detection unit. In the power-saving mode, the detection unit detects an operating state of the image forming apparatus, and the memory unit stores a detection result by the detection unit. When the image forming apparatus returns from the low power consumption state in the power-saving mode to the normal power consumption state, control of a return operation for the image forming apparatus from the power-saving mode is executed, based on the detection result by the detection unit stored in the memory unit.

5 Claims, 14 Drawing Sheets

(56) References Cited

U.S. PATENT DOCUMENTS

2009/0122362 A1* 5/2009 Hirai ................ H04N 1/00708
358/474

* cited by examiner (Normal power consumption state)

IMAGE FORMING APPARATUS

CROSS-REFERENCE TO RELATED APPLICATIONS

This application claims priority under 35. U.S.C. §119(a) to Japanese Patent Application No. 2015-203170, filed on Oct. 14, 2015. The contents of this application are incorporated herein by reference in their entirety.

BACKGROUND OF THE INVENTION

Field of the Invention

The present invention relates to an image forming apparatus such as a copying machine, a multifunction printer, or a facsimile machine, and particularly relates to an image forming apparatus having a power-saving mode in which the apparatus is switched from a predetermined normal power consumption state into a low power consumption state where less energy is supplied than in the normal power consumption state.

Related Art

For energy saving, an image forming apparatus such as a copying machine, a multifunction printer, or a facsimile machine may have a power-saving mode (which may be also called energy-saving mode or electricity-saving mode) in which the apparatus is switched from a predetermined normal power consumption state into a low power consumption state where less energy is supplied than in the normal power consumption state.

An image forming apparatus having a power-saving mode is configured to switch into the power-saving mode if one or more predetermined power-saving mode conditions are met (for example, if the image forming apparatus remains in a standby state for a predetermined time without interruption, and/or, if a motion sensor for detecting a person detects no person). In the power-saving mode, if one or more predetermined power-saving mode release conditions are met (for example, if a user effects a predetermined operation, and/or, if the motion sensor detects a person), the image forming apparatus is configured to return from the low power consumption state in the power-saving mode to the normal power consumption state.

When a conventional image forming apparatus having such a power-saving mode returns from the low power consumption state in the power-saving mode to the normal power consumption state, it is a common practice to execute control of a return operation for the image forming apparatus from the power-saving mode (for example, an initial operation, or an initialization operation, for a predetermined component such as a pick-up roller). Control of the return operation for the image forming apparatus from the power-saving mode is not necessarily obligatory, but is executed constantly in prior art, and constant execution of the control of the return operation for the image forming apparatus from the power-saving mode entails various inconveniences.

Such inconveniences are mentioned by taking, as an example, an image forming apparatus equipped with a sheet placing portion (specifically, a paper feed tray) on which one or more sheets (for example, at least one recording sheet such as a document or a piece of recording paper) are placed, and a sheet feeding apparatus (specifically, a paper feeder) having a pick-up roller which is configured to be capable of moving up and down and to feed the one or more sheets placed on the sheet placing portion, one by one, by moving down from a raised position. In the following exemplary cases, the return operation for the image forming apparatus from the power-saving mode is an initial operation for the pick-up roller.

In this image forming apparatus, if the pick-up roller stays at a lowered position unintentionally (for some reason) before a sheet is set on the sheet placing portion, it is difficult or even impossible to place a sheet on the sheet placing portion.

An example of unintentional descent of the pick-up roller is described by way of the following image forming apparatus. An image forming apparatus is composed of an image reading device having a moving document reading configuration in which an image on a document is read while the document, as the sheet, is caused to move. The image reading device has a document feeding device equipped with a pick-up roller. The document feeding device has, as an opening closing member, an opening closing guide member which is configured to be openable from and closable on a document feeding device main body and which is equipped with the pick-up roller. When the opening closing guide member is operated for opening and closing by a user, a drive connection member such as a gear which constitutes a drive transmission mechanism to the pick-up roller is caused to move away on opening, and/or the opening and closing operation causes vibration or the like. Such displacement and/or vibration causes the pick-up roller to move down from the raised position.

Another example of unintentional descent of the pick-up roller is described by way of the following image forming apparatus. An image forming apparatus is composed of an image reading device which includes not only the moving document reading configuration but also a stationary document reading configuration in which an image on a document is read while the document, as the sheet, is placed on a document placement stand. The image reading device has a document feeding device equipped with a pick-up roller, and a document reading device equipped with a document placement stand. The document feeding device, as an opening closing member, doubles as a document holddown member which is configured to be openable from and closable on the document reading device and, when closed, which holds down a document placed on the document placement stand. When the document feeding device is operated for opening and closing by a user, the opening and closing operation causes vibration or the like, and such vibration causes the pick-up roller to move down from the raised position.

Yet another example of unintentional descent of the pick-up roller is described by way of the following image forming apparatus. An image forming apparatus is composed of an image forming apparatus main body for forming an image. The image forming apparatus main body has a sheet placing portion (specifically, a paper feed tray) which is configured to be attachable to and detachable from the image forming apparatus main body and which places one or more recording sheets as the sheet(s). When the sheet placing portion is operated for opening and closing by a user, the opening and closing operation causes vibration or the like, and such vibration causes the pick-up roller to move down from the raised position.

Still another example of unintentional descent of the pick-up roller is described by way of the following image forming apparatus. An image forming apparatus has an image forming apparatus main body provided with an opening closing member which is configured to be openable from and closable on the image forming apparatus main body. When the opening closing member is operated for opening and closing by a user, a drive connection member such as a gear which constitutes a drive transmission mechanism to the pick-up roller is caused to move away on opening, and/or the opening and closing operation causes vibration or the like. Such displacement and/or vibration causes the pick-up roller to move down from the raised position. Examples of the opening closing member configured to be openable from and closable on the image forming apparatus main body include an opening closing cover member (for example, a front cover member which covers a front face of the main body) and an opening closing guide member (for example, a side guide member which covers a side face of the main body).

In order to solve these inconveniences, the conventional image forming apparatus executes control of an initial operation for the component (e.g. an initial operation of raising the pick-up roller to the raised position), for example, at the start-up of the image forming apparatus (including the reboot in the power-on state) or at the end of a job (a cycle of image forming operation). Further, as a detection unit for detecting the operating state of the image forming apparatus, the conventional image forming apparatus is provided with at least one detection unit for detecting whether the opening closing member is open or closed. When the detection result by the detection unit indicates that the opening closing member is open at first but closed later in the normal power consumption state, the image forming apparatus executes control of an initial operation (e.g. an initial operation of raising the pick-up roller to the raised position, assuming that the pick-up roller has moved down, or may have possibly moved down, from the raised position unintentionally due to an opening and closing operation of the opening closing member by a user). In these cases, the initial operation is, for example, to raise the pick-up roller by means of a motor or a solenoid.

The conventional image forming apparatus executes control of an initial operation to the component, as the control of the return operation for the image forming apparatus from the power-saving mode, also when the image forming apparatus returns from the low power consumption state in the power-saving mode to the normal power consumption state. In this case, when the image forming apparatus returns from the low power consumption state in the power-saving mode to the normal power consumption state, the conventional image forming apparatus constantly executes control of the initial operation, as the control of the return operation for the image forming apparatus from the power-saving mode, irrespective of whether the opening closing member is open or closed (namely, without detecting whether the opening closing member is open or closed in the power-saving mode).

As described, when the image forming apparatus returns from the low power consumption state in the power-saving mode to the normal power consumption state, the conventional image forming apparatus constantly executes control of the initial operation, as the control of the return operation for the image forming apparatus from the power-saving mode, irrespective of whether the opening closing member is open or closed. However, constant execution of the control of the return operation for the image forming apparatus from the power-saving mode entails various inconveniences: a user has to wait while control of the initial operation is executed; the noise of the initial operation for the component (for example, the noise of raising the pick-up roller) is annoying to the user; or, if the image forming apparatus is configured to return from the low power consumption state in the power-saving mode to the normal power consumption state when the presence of a person is detected by a detection result by the motion sensor, control of the initial operation is triggered by mere approach of a user to the image forming apparatus, which makes the user frustrated.

In order to minimize the initial operation in the document feeding device, the image forming apparatus disclosed in JP 2012-95242 A discloses does not basically perform control of an initial operation (see paragraph [0093] in JP 2012-95242 A). When the power-saving mode is cancelled, this image forming apparatus performs control of an initial operation, only if the cover (the opening closing member) of the document feeding device was open or in a certain state just before the image forming apparatus went into the power-saving mode (see paragraphs [0094], [0095], and [0099], and FIG. 7 in JP 2012-95242 A).

Nevertheless, the image forming apparatus disclosed in JP 2012-95242 A does not detect the operating state of the image forming apparatus (specifically, whether the opening closing member is open or closed) in the power-saving mode. Hence, this image forming apparatus cannot execute control of the return operation for the image forming apparatus from power-saving mode without fail, based on the operating state of the image forming apparatus in the power-saving mode.

In view of the above, the present invention aims to provide an image forming apparatus which can avoid inconveniences associated with constant execution of the control of the return operation for the image forming apparatus from the power-saving mode when the image forming apparatus returns from the low power consumption state in the power-saving mode to the normal power consumption state, and which can execute the control of the return operation for the image forming apparatus from the power-saving mode without fail, based on the operating state of the image forming apparatus in the power-saving mode.

SUMMARY OF THE INVENTION

In order to solve the above problems, an image forming apparatus according to the present invention, having a power-saving mode in which the image forming apparatus is switched from a predetermined normal power consumption state to a low power consumption state where less energy is supplied than in the normal power consumption state, possesses following characteristics. The image forming apparatus includes a detection unit configured to detect an operating state of the image forming apparatus, and a memory unit configured to store a detection result by the detection unit. In the power-saving mode, the detection unit detects an operating state of the image forming apparatus, and the memory unit stores a detection result by the detection unit. When the image forming apparatus returns from the low power consumption state in the power-saving mode to the normal power consumption state, control of a return operation for the image forming apparatus from the power-saving mode is executed, based on the detection result by the detection unit stored in the memory unit.

In an exemplary embodiment of the present invention, the image forming apparatus further includes an opening closing member configured to be openable and closable, and the detection unit is configured to detect whether the opening closing member is open or closed. In the power-saving mode, the detection unit detects an open/closed state of the opening closing member, and the memory unit stores the open/closed state of the opening closing member based on a detection result by the detection unit. When the image forming apparatus returns from the low power consumption state in the power-saving mode to the normal power consumption state, if detection of the open/closed state of the opening closing member in the power-saving mode is indicated by the detection result by the detection unit stored in the memory unit, control of an initial operation for a predetermined component is executed as the control of the return operation for the image forming apparatus from the power-saving mode, and if non-detection of the open/closed state of the opening closing member in the power-saving mode is indicated by the detection result by the detection unit stored in the memory unit, control of the initial operation is not executed as the control of the return operation for the image forming apparatus from the power-saving mode.

In an exemplary embodiment of the present invention, the detection unit detects the open/closed state of the opening closing member in the normal power consumption state. The control of the initial operation is executed if the detection result by the detection unit indicates that the opening closing member is open at first but closed later.

In an exemplary embodiment of the present invention, the image forming apparatus further includes a sheet placing portion for placing one or more sheets, and a sheet feeding apparatus having a pick-up roller, the pick-up roller being configured to be capable of moving up and down and to feed the one or more sheets placed on the sheet placing portion, one by one, by moving down from a raised position. The initial operation is an operation for raising the pick-up roller at the raised position.

In an exemplary embodiment of the present invention, the image forming apparatus further includes an image reading device having a moving document reading configuration in which an image on a document, as the sheet, is read while the document is caused to move. The image reading device includes a document feeding device having the pick-up roller. The opening closing member is openable from and closable on a document feeding device main body, and is equipped with the pick-up roller.

In an exemplary embodiment of the present invention, the image forming apparatus further includes an image reading device having a moving document reading configuration in which an image on a document is read while the document, as the sheet, is caused to move, and a stationary document reading configuration in which an image of a document is read while the document, as the sheet, is placed on a document placement stand. The image reading device includes a document feeding device having the pick-up roller, and a document reading device having the document placement stand. The opening closing member is the document feeding device which is openable from and closable on the document reading device and, when closed, which holds down the document placed on the document placement stand.

According to the present invention, the image forming apparatus can avoid various inconveniences associated with constant execution of the control of the return operation for the image forming apparatus from the power-saving mode when the image forming apparatus returns from the low power consumption state in the power-saving mode to the normal power consumption state, and can execute the control of the return operation for the image forming apparatus from the power-saving mode without fail, based on the operating state of the image forming apparatus in the power-saving mode.

DESCRIPTION OF PREFERRED EMBODIMENTS

Hereinafter, embodiments of the present invention are described with reference to the drawings.

[Image Forming Apparatus]

Figure 1:
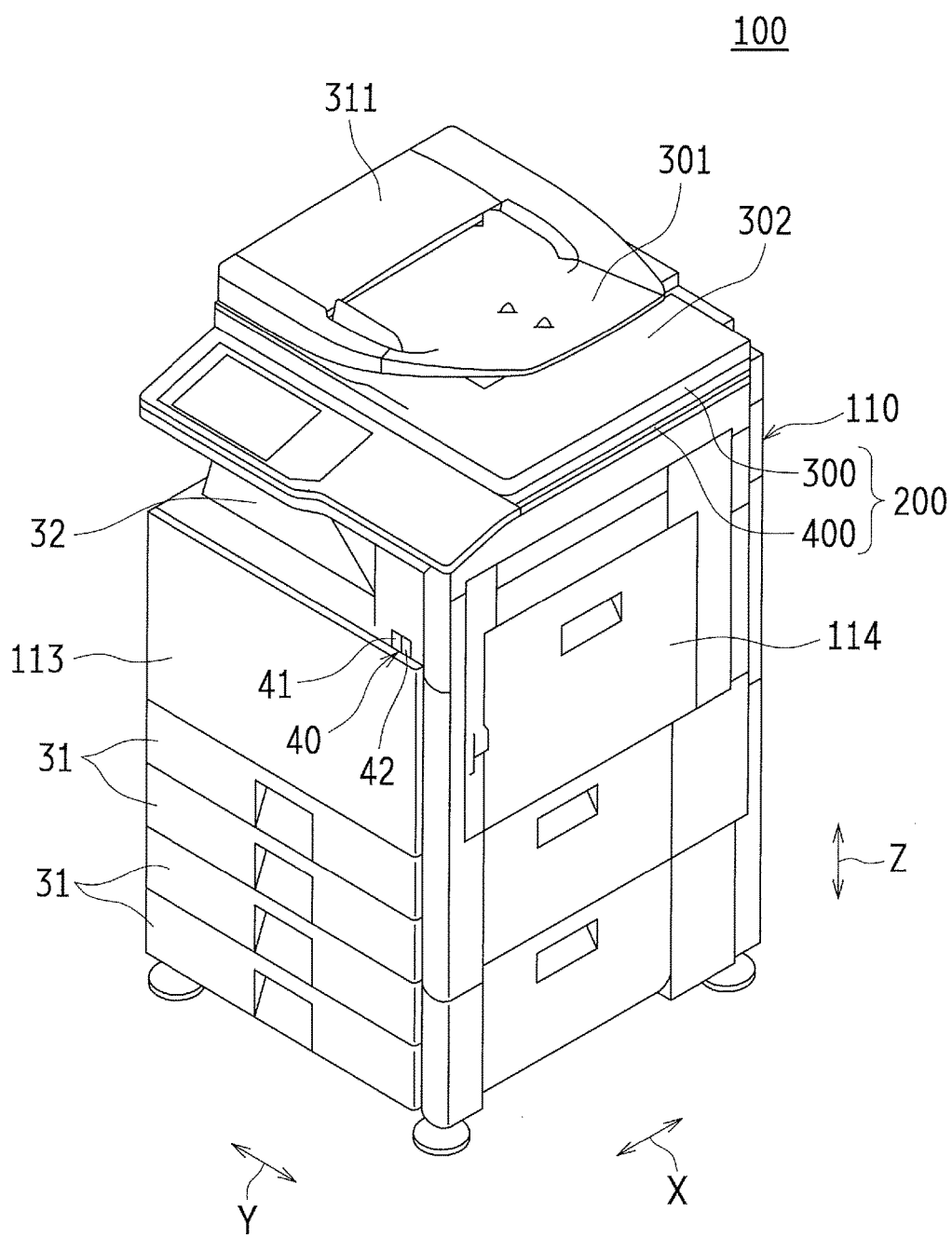
FIG. 1 is a perspective view showing a schematic configuration of an image forming apparatus according to the embodiments of the invention.
Figure 2:
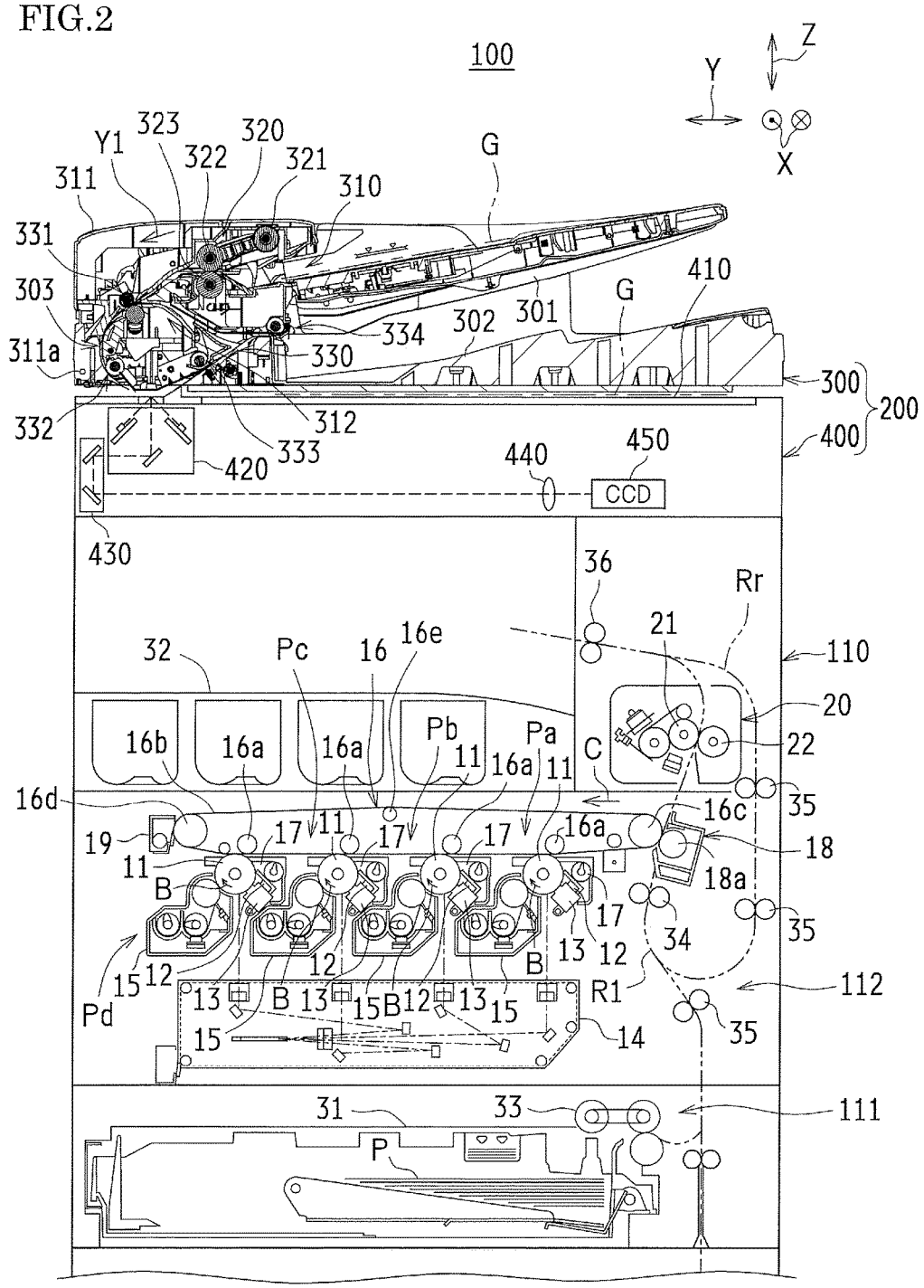
FIG. 2 is a front see-through view showing the schematic configuration of the image forming apparatus shown in FIG. 1.

FIG. 1 is a perspective view showing a schematic configuration of an image forming apparatus 100 according to the embodiments of the invention. FIG. 2 is a front see-through view showing the schematic configuration of the image forming apparatus 100 shown in FIG. 1.

As shown in FIGS. 1 and 2, the image forming apparatus 100 includes an image reading device 200 and an image forming apparatus main body 110. The image forming apparatus 100 forms a monochromatic image or a color image on a recording sheet P such as a piece of recording paper (see FIG. 2) by the image forming apparatus main body 110, based on image data read by the image reading device 200 or image data sent from an external device.

The image reading device 200 is mounted on a top surface of the image forming apparatus main body 110. The image reading device 200 includes a document feeding device 300 and a document reading device 400. The image reading device 200 reads a document G (an example of the sheet) (see FIG. 2) conveyed by the document feeding device 300 or a document G placed on a document placement stand 410 (see FIG. 2), each by means of the document reading device 400, and outputs an image of the read document G as image data.

The image forming apparatus 100 is an image forming apparatus based on electrophotographic printing, and is what is known as a tandem-type color image forming apparatus in which a plurality of image carriers (specifically, photoconductors) are arranged side by side in predetermined directions (in this example, crosswise directions Y). In this example, the image forming apparatus 100 is an intermediate transfer-type color multifunction printer capable of forming a full color image. The image forming apparatus 100 in the present embodiments is a tandem-type color image forming apparatus, but may be a color image forming apparatus of different type. Further, the image forming apparatus 100 in the present embodiments is a color image forming apparatus, but may be a monochromatic image forming apparatus.

As shown in FIG. 2, the image forming apparatus main body 110 is provided with photoconductors 11 (specifically, photoconductive drums), static eliminators 12, chargers 13 as charging units, an exposure device 14, development apparatuses 15, an intermediate transfer belt device 16 as a primary transfer device, drum cleaners 17, a secondary transfer apparatus 18, a belt cleaner 19, a fixing apparatus 20, a sheet conveyance path R1 (specifically, a conveyance path for a recording sheet P), one or more (more than one in this example) paper feed trays 31 (see also FIG. 1), and a discharge tray 32 (see also FIG. 1).

In the image forming apparatus main body 110, the surfaces of the photoconductors 11 are electrostatically charged by the chargers 13. The charged areas are exposed to form electrostatic latent images by the exposure device 14. The electrostatic latent images are visualized (developed) as toner images by the development apparatuses 15. The visualized toner images are electrostatically transferred on the intermediate transfer belt device 16. The toner images transferred on the intermediate transfer belt device 16 are transferred on a recording sheet P by the secondary transfer apparatus 18. By the fixing apparatus 20, the toner images are fixed on the recording sheet P to which the toner images have been transferred. In other words, the image forming apparatus main body 110 serves as an image forming unit for forming an image on a recording sheet P.

To form a color image, toner images in black (K), cyan (C), magenta (M), and yellow (Y) are laid over each other. To form four kinds of toner images corresponding to these colors, four imaging stations Pa, Pb, Pc, Pd corresponding to black, cyan, magenta, and yellow, respectively, are constituted by four each of the photoconductors 11, the static eliminators 12, the chargers 13, the development apparatuses 15, and the drum cleaners 17.

In each of the imaging stations Pa, Pb, Pc, Pd, the following operations are carried out in the same manner.

To start with, while the photoconductors 11-11 are rotationally driven in a predetermined rotational direction B (see FIG. 2), the surfaces of the photoconductors 11-11 are irradiated by the static eliminators 12-12, so that electric charges (residual charges) are removed (statically eliminated) from the surfaces of the photoconductors 11-11.

The surfaces of the photoconductors 11-11 from which electric charges have been statically eliminated by the static eliminators 12-12 are uniformly charged at a predetermined potential by the chargers 13-13.

The surfaces of the photoconductors 11-11 which have been uniformly charged by the chargers 13-13 are exposed by the exposure device 14 to form electrostatic latent images on the surfaces of the photoconductors 11-11.

The electrostatic latent images formed on the surfaces of the photoconductors 11-11 by the exposure device 14 are developed by the development apparatuses 15-15 to form toner images on the surfaces of the photoconductors 11-11.

A series of these operations is carried out in the imaging stations Pa, Pb, Pc, Pd, thereby forming toner images in the corresponding colors on the surfaces of the photoconductors 11-11.

The intermediate transfer belt device 16 is equipped with primary transfer rollers 16a, an intermediate transfer belt 16b, a driving transfer roller 16c, a driven transfer roller 16d, and a tension roller 16e. In order to form four types of toner images in the corresponding colors, four primary transfer rollers 16a are provided independently inside the intermediate transfer belt 16b. By the primary transfer rollers 16a-16a, the toner images formed on the surfaces of the photoconductors 11-11 in the four colors are transferred onto the intermediate transfer belt 16b which circulates in a direction of the arrow C. The intermediate transfer belt 16b is looped around the driving transfer roller 16c, the driven transfer roller 16d, and the tension roller 16e.

The drum cleaners 17-17 remove and collect residual toner which has not been transferred onto the intermediate transfer belt 16b and which has remained on the surfaces of the photoconductors 11-11.

The secondary transfer apparatus 18 is equipped with a secondary transfer roller 18a. The secondary transfer roller 18a is disposed to form a nip region between the intermediate transfer belt 16b and the secondary transfer roller 18a. The secondary transfer roller 18a conveys a recording sheet P which has been conveyed through the sheet conveyance path R1, by catching the recording sheet P in the nip region. When the recording sheet P passes through the nip region, the toner image (e.g. a color toner image) formed on the surface of the intermediate transfer belt 16b is transferred on the recording sheet P.

The belt cleaner 19 removes and collects residual toner which has not been transferred onto the recording sheet P and which has remained on the surface of the intermediate transfer belt 16b.

The fixing apparatus 20 includes a heating roller 21 and a pressure roller 22. The recording sheet P on which the toner image has been transferred is heated and pressed in between the heating roller 21 and the pressure roller 22, so that the toner image is fixed on the recording sheet P.

The paper feed trays 31-31 hold recording sheets P in a stacked manner. Each of the paper feed trays 31-31 is equipped with a pick-up roller 33 on the recording sheet P supply side. The pick-up roller 33 pulls out a recording sheet P, one sheet at a time, from the paper feed tray 31, and supplies the recording sheet P into the sheet conveyance path R1. Each of the paper feed trays 31-31 serves as an opening closing member which is configured to be openable and closable. The opening-closing action of each opening closing member can cause a pick-up roller 321 in the document feeding device 300 to move down. This also applies to the other opening closing members to be described later.

Each of the paper feed trays 31-31 is configured to be attachable to and detachable from the image forming apparatus main body 110, and serves as a sheet placing portion for placing one or more recording sheets P. The pick-up roller 33 is configured to be capable of being raised and lowered. By being lowered from the raised position, the pick-up roller 33 supplies one or more recording sheets P placed on the paper feed trays 31-31, one by one.

The image forming apparatus main body 110 also includes at least one sheet feeding apparatus 111 having the pick-up roller 33, and a sheet conveyance apparatus 112 for conveying the recording sheet P supplied from the sheet feeding apparatus 111.

The sheet conveyance apparatus 112 has a pair of registration rollers 34, pairs of conveyance rollers 35-35, and a driving unit for driving these rollers (not shown).

The sheet conveyance apparatus 112 conveys a recording sheet P in the sheet conveyance path R1, via the secondary transfer apparatus 18 and the fixing apparatus 20, to a pair of discharge rollers 36. The discharge rollers 36 are provided on the recording sheet P discharge side in the sheet conveyance path R1. The discharge rollers 36 discharge the recording sheet P which has been conveyed in the sheet conveyance path R1, to the discharge tray 32. The sheet conveyance path R1 is equipped with the pair of registration rollers 34 and the pairs of conveyance rollers 35-35. The registration rollers 34 temporarily stop the recording sheet P to align the leading end of the recording sheet P, and resume the conveyance of the recording sheet P in synchronization with the transfer timing of the toner image at the nip region between the intermediate transfer belt 16b and the secondary transfer roller 18a. The pairs of conveyance rollers 35-35 assist the conveyance of the recording sheet P.

The sheet conveyance path R1 also includes a reverse path Rr. To form images on both faces of the recording sheet P in the image forming apparatus main body 110, the recording sheet P with a first toner image fixed on the front face is conveyed from the discharge rollers 36 in a reverse direction into the reverse path Rr, turned over, and guided again in between the registration rollers 34. Then, a second toner image is fixed on the back face of the recording sheet P in the same manner as on the front face. Finally, the recording sheet P is discharged onto the discharge tray 32.

As opening closing members configured to be openable from and closable on the image forming apparatus main body 110, the image forming apparatus main body 110 has an opening closing cover member 113 (in this example, a front cover member which covers the front side of the main body) (see FIG. 1) and an opening closing guide member 114 (in this example, a side guide member which covers the right side of the main body) (see FIG. 1). The opening closing guide member 114, when closed on the image forming apparatus main body 110, constitutes the sheet conveyance path R1 (specifically, the sheet conveyance path for a recording sheet P).

In FIGS. 1 and 2 above and in FIGS. 3 to 11 to be described later, the symbol X represents width directions (depth directions); the symbol Y represents crosswise directions (left-right directions) orthogonal to the width directions X; and the symbol Z represents vertical directions (height directions). Regarding FIGS. 1 and 2, numbered constituent elements not mentioned above will be described later.

[Overall Configuration of the Image Reading Device]

Figure 3:
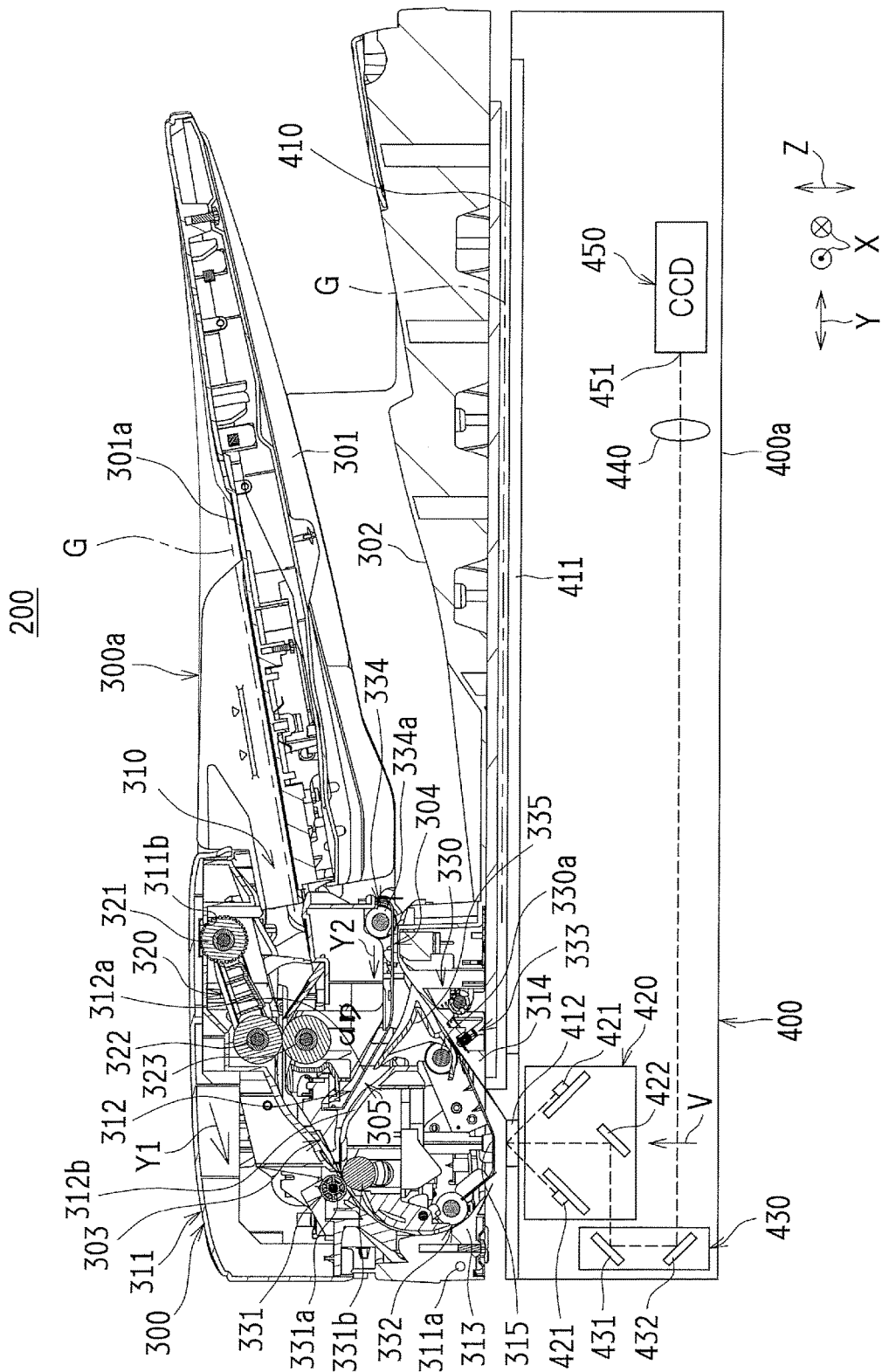
FIG. 3 a front see-through view showing the schematic configuration of an image reading device shown in FIGS. 1 and 2.
Figure 4:
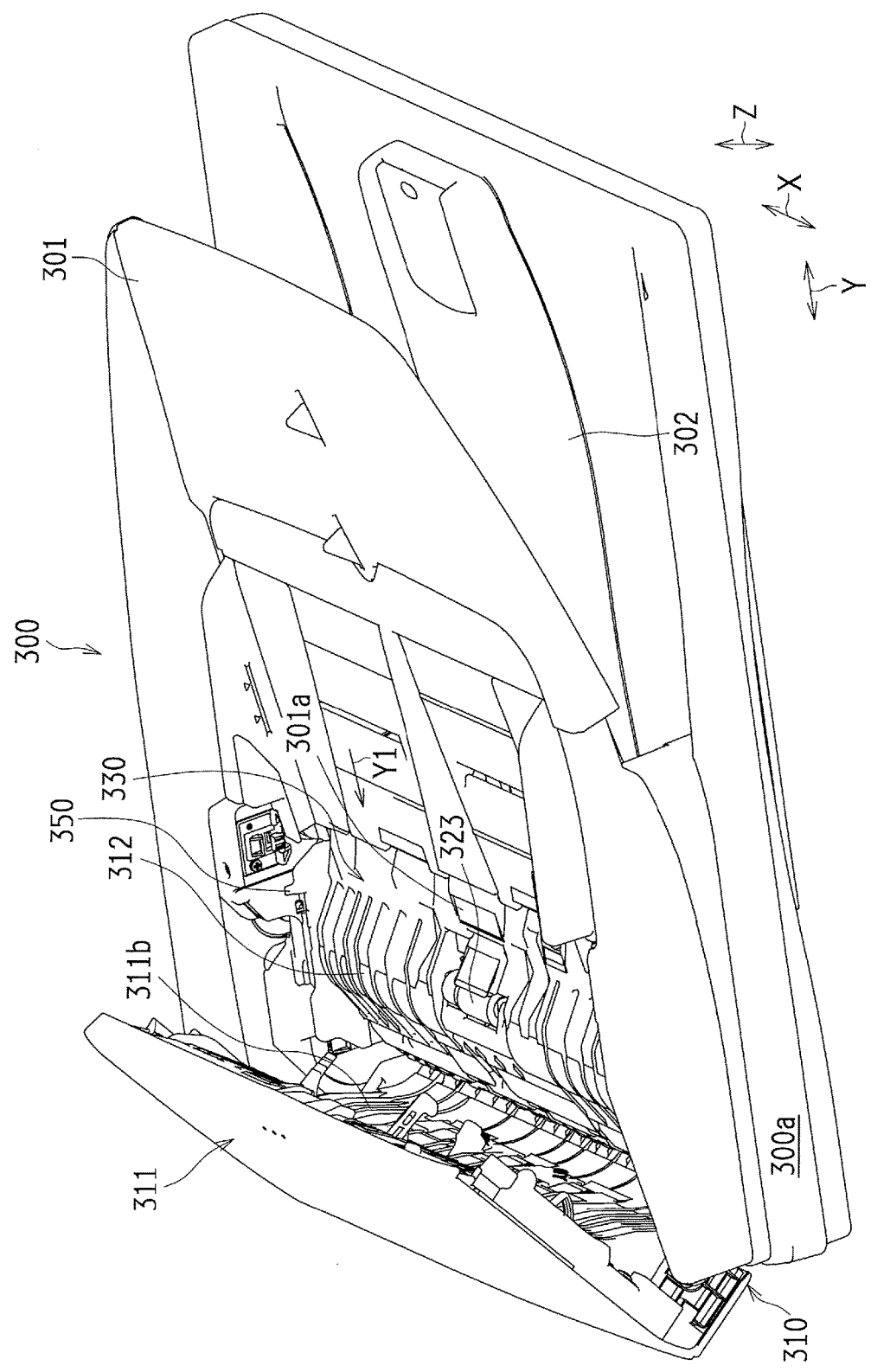
FIG. 4 is a perspective view showing a document feeding device in the image reading device shown in FIGS. 1 and 2, with an opening closing guide member being open from a document feeding device main body.
Figure 5:
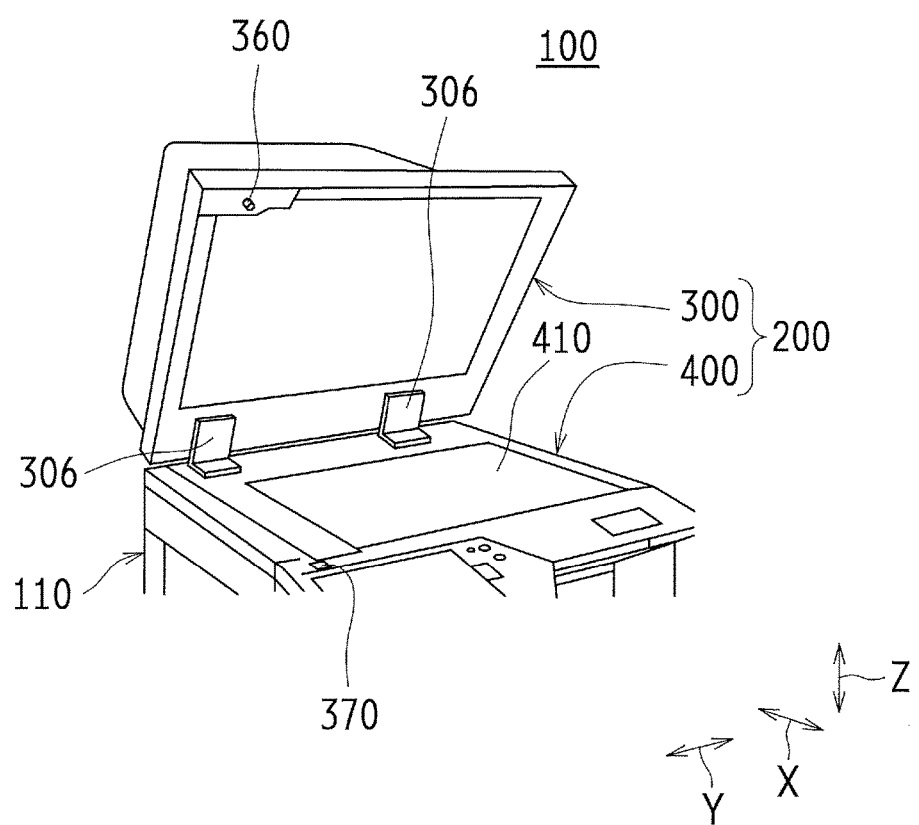
FIG. 5 is a perspective view showing the document feeding device in the image reading device shown in FIGS. 1 and 2, with the document feeding device being open from a document reading device.
Figure 6:
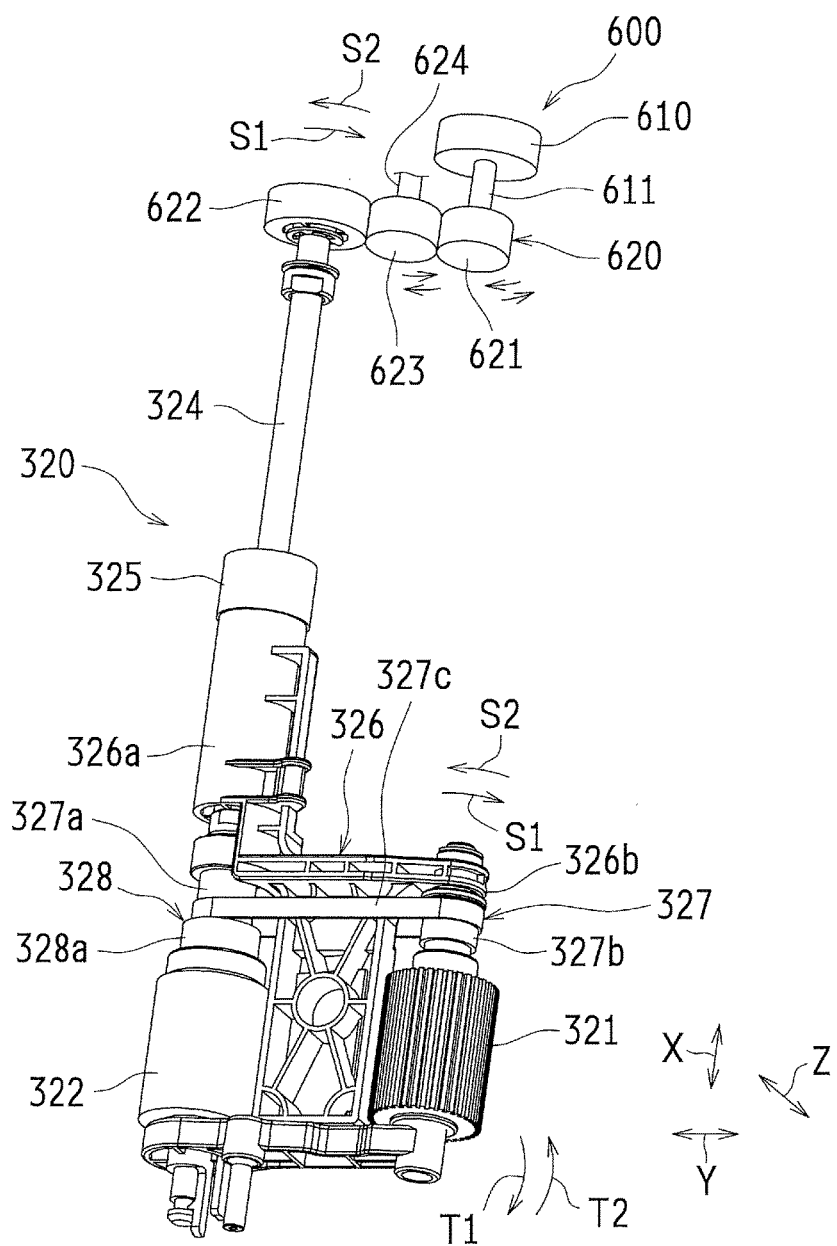
FIG. 6 is a perspective view of a sheet feeding apparatus taken out of the image reading device.

FIG. 3 a front see-through view showing the schematic configuration of the image reading device 200 shown in FIGS. 1 and 2. FIG. 4 is a perspective view showing the document feeding device 300 in the image reading device 200 shown in FIGS. 1 and 2, with the opening closing guide member 311 being open from a document feeding device main body 300a. FIG. 5 is a perspective view showing the document feeding device 300 in the image reading device 200 shown in FIGS. 1 and 2, with the document feeding device 300 being open from the document reading device 400. FIG. 6 is a perspective view of a sheet feeding apparatus 320 taken out of the image reading device 200.

The image reading device 200 is an image reading device of reduction optical system type. The image reading device 200 has a stationary document reading configuration in which an image on a document G is read by a stationary document reading method while the document G is placed on a document placement stand 410, and a moving document reading configuration in which an image on a document G is read by a moving document reading method while the document G is caused to move.

In the stationary document reading configuration, a document G is set on a platen glass 411 (see FIG. 3) which constitutes the document placement stand 410, and illuminated through the platen glass 411 by a light source unit 420 (see FIG. 3) which serves as a lighting device. To read an image on the document, the light source unit 420 is moved in a sub-scanning direction (one of the crosswise directions Y), and, at the same time, the light source unit 420 illuminates the document G and receives reflected light from the document G by scanning in main scanning directions (the width directions X) orthogonal to the sub-scanning direction.

In the moving document reading configuration, a document G is conveyed in a predetermined conveyance direction Y1 (see FIG. 3) by the document feeding device 300 in such a manner as to pass over a document reading glass 412 (see FIG. 3) which constitutes the document placement stand 410. The light source unit 420 is positioned at a predetermined position V (see FIG. 3) in the document reading device 400. To read an image on the document, the light source unit 420 illuminates the document G through the document reading glass 412, and, at the same time, receives reflected light from the document G by scanning in the main scanning directions (the width direction X).

To be specific, the document reading device 400, as shown in FIG. 3, has the platen glass 411, the document reading glass 412, and the light source unit 420, and further has an optical system driving unit (not shown) for moving the light source unit 420, a mirror unit 430, a condensing lens 440, and a photoelectric transducer (CCD in this example) 450, all of which are housed in a frame 400a. The light source unit 420 contains a light source 421 configured to emit light to the document G, and a first mirror 422 configured to guide reflected light from the document G to the mirror unit 430.

The platen glass 411 and the document reading glass 412 are made of transparent glass plates, and their ends in the main scanning directions (the width directions X) rest on the frame 400a. The opening closing member is the document feeding device 300 which is openable from and closable on the document reading device 400 and, when closed, which holds down the document G placed on the document placement stand 410. To be specific, the document feeding device 300 can be opened from and closed on the document reading device 400 about an axis extending in the sub-scanning directions (the crosswise directions Y) (specifically, held axially on hinges 306, 306 (see FIG. 5)), on a second side in the width directions X (specifically, the rear side). The bottom surface of the document feeding device 300 doubles as a document holddown member for holding down the document G placed on the platen glass 411 of the document reading device 400. Owing to this configuration, when the document feeding device 300 is opened to uncover the platen glass 411 of the document reading device 400, the image reading device 200 allows a document G to be placed on the platen glass 411. Thus, the document feeding device 300 serves as an opening closing member.

The mirror unit 430 contains a second mirror 431, a third mirror 432, and a support member (not shown). The support member in the mirror unit 430 supports the second mirror 431 such that light from the first mirror 422 in the light source unit 420 can be reflected by the second mirror 431 and guided toward the third mirror 432. The support member in the mirror unit 430 also supports the third mirror 432 such that light from the second mirror 431 can be reflected by the third mirror 432 and guided toward the condensing lens 440. The condensing lens 440 focuses light from the third mirror 432 in the mirror unit 430 to a light-receiving surface 451 of the photoelectric transducer 450. The photoelectric transducer 450 converts light (document image light) from the condensing lens 440 into an electric signal as image data.

The optical system driving unit in the document reading device 400 is configured to move the light source unit 420 at a constant speed in a sub-scanning direction (one of the crosswise directions Y) and also to move the mirror unit 430 in the sub-scanning direction (the same crosswise direction Y) at half a speed of the moving speed of the light source unit 420.

The document feeding device 300 includes a document tray 301 (an example of the sheet placing portion) (see FIGS. 3 and 4) for placing one or more documents G to be conveyed, a discharge tray 302 (see FIGS. 3 and 4) disposed under the document tray 301, a sheet conveyance path 303 and a sheet discharge path 304 (see FIG. 3) which connect the document tray 301 and the discharge tray 302, a sheet feeding apparatus 320 (see FIG. 3) having the pick-up roller 321 (see FIG. 3), and a sheet conveyance apparatus 330 for conveying the document G fed by the sheet feeding apparatus 320. The document tray 301 serves as a sheet placing portion for placing one or more documents G. The sheet conveyance path 303 is defined by a sheet conveyance guide part 310. The pick-up roller 321 is configured to be capable of being raised and lowered. By being lowered from the raised position, the pick-up roller 321 supplies one or more documents G placed in the document tray 301, one by one.

(Sheet Conveyance Guide Part)

The opening closing member is openable from and closable on the document feeding device main body 300a, and is equipped with the pick-up roller 321. To be specific, when a document G is conveyed, the sheet conveyance guide part 310 guides the document G to be conveyed. The sheet conveyance guide part 310 has an opening closing guide member 311 and a conveyance guide member 312. To improve work efficiency in removing a jammed document G or in maintenance work such as cleaning of the constituent elements, the opening closing guide member 311 is openable from and closable on the document feeding device main body 300a. The opening closing guide member 311, working as an opening closing member, is equipped with the pick-up roller 321. The opening closing guide member 311, when closed on the document feeding device main body 300a, constitutes the sheet conveyance path 303 (specifically, the conveyance path for the document G).

The opening closing guide member 311 is swingable about an axis extending in the width directions X of the document G, the width directions X being orthogonal or substantially orthogonal to the conveyance direction Y1 of the document G.

To be specific, the opening closing guide member 311 is swingably provided on a swing axis 311a (see FIG. 3) which extends in the width directions X. In this example, the swing axis 311a is fixed on the document feeding device main body 300a.

The conveyance guide member 312 is provided in the document feeding device main body 300a. When the opening closing guide member 311 is closed, the conveyance guide member 312 is covered by the opening closing guide member 311 and defines a sheet conveyance path 303 for passing the document G between the opening closing guide member 311 and the conveyance guide member 312.

(Sheet Feeding Apparatus)

The sheet feeding apparatus 320 supplies the document G, one sheet at a time, from the document tray 301 to the sheet conveyance path 303.

To be specific, the sheet feeding apparatus 320 is further equipped with a sheet feeding roller 322 (see FIG. 3), and a separation member such as a separation roller or a separation pad (in this example, a separation roller 323), in addition to the pick-up roller 321.

The pick-up roller 321 feeds a document G placed on the document tray 301, in the conveyance direction Y1, from the document tray 301 toward the sheet feeding roller 322 and the separation roller 323. The sheet feeding roller 322 is disposed downstream of the pick-up roller 321 in the conveyance direction Y1, nips the document G sent by the pick-up roller 321 in between the sheet feeding roller 322 and the separation roller 323, and conveys the document G further downstream in the conveyance direction Y1.

The separation roller 323, disposed face to face with the sheet feeding roller 322, separates one document G from another such that the document G is conveyed one by one in between the sheet feeding roller 322 and the separation roller 323.

The pick-up roller 321 and the sheet feeding roller 322 are provided in the opening closing guide member 311, and the separation roller 323 is provided in the conveyance guide member 312. Hence, when the opening closing guide member 311 is closed and defines the sheet conveyance path 303 with the conveyance guide member 312, the pick-up roller 321 is positioned over the document tray 301, and the sheet feeding roller 322 and the separation roller 323 are pressed against each other.

As shown in FIG. 6, the sheet feeding apparatus 320 is further equipped with a drive axis 324, a torque limiter 325, a pivotable support member 326, a first one-way drive transmission mechanism 327, and a second one-way drive transmission mechanism 328.

The drive axis 324 receives a rotational driving force generated by a drive motor 610 in a drive assembly 600, via a drive transmission mechanism (in this example, a gear train 620).

To be specific, the gear train 620 is composed of a first drive transmission gear 621 fixed on a rotation axis 611 of the drive motor 610, a second drive transmission gear 622 fixed on the drive axis 324, an intermediate gear 623 rotatably supported on a support axis 624 which is held on a main body frame (not shown) of the drive assembly 600. The intermediate gear 623 meshes with both the first drive transmission gear 621 and the second drive transmission gear 622, and transmits a rotational driving force from the first drive transmission gear 621 to the second drive transmission gear 622. The thus configured gear train 620 can transmit the rotational driving force from the drive motor 610, via the first drive transmission gear 621, the intermediate gear 623, and the second drive transmission gear 622, to the drive axis 324.

The torque limiter 325 has an axial rotation portion connected with the drive axis 324, and an outer rotation portion provided on an outer periphery of the axial rotation portion. The outer rotation portion is configured to rotate with the axial rotation portion while a torque load applied to the outer rotation portion is less than a predetermined value, and not to rotate, even if the axial rotation portion rotates, when the torque load applied to the outer rotation portion exceeds the predetermined value (i.e. configured to spin idly with respect to the axial rotation portion). Namely, the torque limiter 325 is configured such that the outer rotation portion rotates with the axial rotation portion driven by the drive axis 324 while the torque load applied to the outer rotation portion is less than a predetermined value, but such that the outer rotation portion does not rotate when the torque load applied to the outer rotation portion exceeds the predetermined torque even if the axial rotation portion rotates (i.e. the outer rotation portion spins idly with respect to the axial rotation portion).

The axial rotation portion of the torque limiter 325 is fixed on the outer periphery of the drive axis 324, and the outer rotation portion of the torque limiter 325 is connected with a first end portion 326a of the pivotable support member 326. In the pivotable support member 326, the first end portion 326a is rotatably held on the drive axis 324, and a second end portion 326b holds the pick-up roller 321 rotatably around the rotation axis.

In the sheet feeding apparatus 320 thus configured, when the drive axis 324 rotates in a rotational drive direction (a conveyance direction of the document G) S1, the pivotable support member 326 pivots in a downward direction T1, and causes the pick-up roller 321 to move down from the raised position until the pick-up roller 321 abuts on a top surface 301a (see FIGS. 3 and 4) of the document tray 301 (see FIGS. 3 and 4) via the document G (see FIG. 3). In this state, the pick-up roller 321 pushes the document G placed on the top surface 301a of the document tray 301, with the torque limiter 325 slipping. Thus, the torque limiter 325 serves to provide the pick-up roller 321 with a pushing force against the document G. On the other hand, when the drive axis 324 rotates in a reverse direction S2 opposite to the rotational drive direction S1, the pivotable support member 326 pivots in an upward direction T2, and causes the pick-up roller 321 to move up until the pick-up roller 321 abuts on a bottom surface 311b (see FIGS. 3 and 4) of the opening closing guide member 311 (see FIGS. 3 and 4). In this state, the pick-up roller 321 is kept at the raised position, with the torque limiter 325 slipping. As a result, the torque limiter 325 further serves to keep the pick-up roller 321 at the raised position. The drive motor 610, in a stopped state, can keep the pick-up roller 321 at the raised position by a detent torque (a holding torque in an unconducting state).

The first one-way drive transmission mechanism 327 has a pulley equipped with a one-way clutch (specifically, a one-way pulley 327a), a fixed pulley 327b coaxially fixed on the pick-up roller 321, and an endless drive transmission belt 327c which transmits a rotational driving force from the one-way pulley 327a to the fixed pulley 327b.

The one-way pulley 327a has an axial rotation portion connected with the drive axis 324, and an outer rotation portion provided on an outer periphery of the axial rotation portion. The outer rotation portion is configured to be rotatable relative to the axial rotation portion in the rotational drive direction S1 and not to rotate in the reverse direction S2 opposite to the rotational drive direction S1.

The axial rotation portion of the one-way pulley 327a is fixed on the outer periphery of the drive axis 324. The drive transmission belt 327c is looped around the outer periphery of the outer rotation portion of the one-way pulley 327a and the outer periphery of the fixed pulley 327b.

When the drive axis 324 rotates in the rotational drive direction S1, the outer rotation portion of the one-way pulley 327a rotates with the axial rotation portion, so that the rotational driving force of the drive axis 324 is transmitted to the fixed pulley 327b via the drive transmission belt 327c. As a result, the pick-up roller 321 can convey a document G by the rotational driving force from the drive motor 610.

When the drive axis 324 is not rotating, the one-way pulley 327a permits the fixed pulley 327b to rotate in the rotational drive direction S1 via the drive transmission belt 327c. As a result, when the rotational driving force from the drive motor 610 is not transmitted, the pick-up roller 321 can rotate in the rotational drive direction S1 relative to the drive axis 324.

The second one-way drive transmission mechanism 328 has a coupling member equipped with a one-way clutch (specifically, a one-way coupling 328a).

The one-way coupling 328a has an axial rotation portion connected with the drive axis 324, and an outer rotation portion provided on an outer periphery of the axial rotation portion. The outer rotation portion is configured to be rotatable relative to the axial rotation portion in the rotational drive direction S1 but not to rotate in the reverse direction S2 opposite to the rotational drive direction S1.

The axial rotation portion of the one-way coupling 328a is fixed on the outer periphery of the drive axis 324, and the outer rotation portion of the one-way coupling 328a is coaxially fixed on the sheet feeding roller 322. The sheet feeding roller 322 is rotatably held on the drive axis 324.

When the drive axis 324 rotates in the rotational drive direction S1, the outer rotation portion of the one-way coupling 328a rotates with the axial rotation portion, so that the rotational driving force of the drive axis 324 is transmitted to the sheet feeding roller 322. As a result, the sheet feeding roller 322 can convey a document G by the rotational driving force from the drive motor 610.

When the drive axis 324 is not rotating, the one-way coupling 328a permits the sheet feeding roller 322 to rotate in the rotational drive direction S1. As a result, when the rotational driving force from the drive motor 610 is not transmitted, the sheet feeding roller 322 can rotate in the rotational drive direction S1 relative to the drive axis 324.

In the document feeding device 300 thus configured, when the drive motor 610 is rotationally driven in the rotational drive direction (a conveyance direction of the recording sheet P) S1, the pivotable support member 326 pivots in the downward direction T1 via the torque limiter 325, and causes the pick-up roller 321 to move down from the raised position and to rotate axially in the rotational drive direction (the conveyance direction of the recording sheet P) S1.

Next, in the document feeding device 300, as shown in FIG. 3, the document G is conveyed by the pick-up roller 321 in between the sheet feeding roller 322 and the separation roller 323, where a document G is separated from the others, and conveyed, one sheet at a time, by the rotationally driven sheet feeding roller 322. The document G conveyed from the sheet feeding roller 322 is guided into the sheet conveyance path 303 and conveyed toward the sheet conveyance apparatus 330.

In the document feeding device 300, after the operation for supplying the document G ends, the drive motor 610 is rotationally driven in the reverse direction S2 opposite to the rotational drive direction S1. Then, the pivotable support member 326 pivots in the upward direction T2 via the torque limiter 325, so that the pick-up roller 321 is kept at the raised position.

(Sheet Conveyance Apparatus)

As shown in FIG. 3, the sheet conveyance apparatus 330 conveys the document G supplied from the sheet feeding apparatus 320 to the discharge tray 302.

To be specific, the sheet conveyance apparatus 330 is equipped with a pair of registration rollers 331, a pair of upstream conveyance rollers 332, a pair of downstream conveyance rollers 333, and a discharging conveyance unit 334.

The pair of registration rollers 331 is configured to temporarily stop the document G which has been conveyed from the sheet feeding apparatus 320 through the sheet conveyance path 303, and to resume the conveyance of the document G at a predetermined timing.

The pair of registration rollers 331 is composed of a first registration roller 331a provided in the opening closing guide member 311, and a second registration roller 331b provided in the conveyance guide member 312 in the document feeding device main body 300a. Accordingly, when the opening closing guide member 311 is closed to form the sheet conveyance path 303 by the opening closing guide member 311 and the conveyance guide member 312, the first registration roller 331a and the second registration roller 331b are pressed against each other to constitute the pair of registration rollers 331.

The pair of upstream conveyance rollers 332 is disposed downstream of the pair of registration rollers 331 in the conveyance direction Y1 of the document G and upstream of the document reading glass 412, and conveys the document G on the upstream side of the document reading glass 412. The pair of downstream conveyance rollers 333 is disposed upstream of the discharging conveyance unit 334 in the conveyance direction Y1 and downstream of the document reading glass 412, and conveys the document G on the downstream side of the document reading glass 412. Namely, the pair of upstream conveyance rollers 332, the document reading glass 412, and the pair of downstream conveyance rollers 333 are disposed in this order in the sheet conveyance path 303. The document reading glass 412 is laid substantially horizontally so as to constitute a part of a guide wall of the sheet conveyance path 303.

In this example, the document feeding device 300 is configured to convey the document G such that one face (front face) thereof can be read, to reverse and turn over the document G, and to convey the document G such that the other face (back face) can be read.

To be specific, the sheet conveyance guide part 310 is configured to turn over the document G from one face to the other.

The sheet conveyance path 303 is configured to turn over the document G while the document G fed from the sheet feeding apparatus 320 is passing therethrough. The sheet conveyance path 303 has a loop-like configuration, such that the document G is guided from the sheet feeding roller 322, via the pair of registration rollers 331, the pair of upstream conveyance rollers 332, the document reading glass 412, and the pair of downstream conveyance rollers 333, to the discharging conveyance unit 334.

The sheet conveyance guide part 310 is further equipped with an upstream guide 313, a downstream guide 314, and a document reading guide 315, in the document feeding device main body 300a. The document reading guide 315 guides the document G between itself and the upstream guide 313, the downstream guide 314, and the document reading glass 412. The upstream guide 313 and the downstream guide 314 are configured to guide, together with the document reading guide 315, the document G conveyed by the pair of upstream conveyance rollers 332 and the pair of downstream conveyance rollers 333, respectively.

To be specific, the upstream guide 313 is disposed upstream of the document reading glass 412 in the conveyance direction Y1. The downstream guide 314 is disposed downstream of the document reading glass 412 in the conveyance direction Y1. The document reading guide 315 is provided to face the upstream guide 313, the downstream guide 314, and the document reading glass 412, with a predetermined gap. The sheet conveyance path 303 is defined between the document reading guide 315, and the upstream guide 313, the document reading glass 412 and the downstream guide 314.

The discharging conveyance unit 334 is configured to discharge the document G from the sheet conveyance path 303 to the outside.

In the present embodiments, the image reading device 200 is configured to read both faces of the document G.

The discharging conveyance unit 334 is further configured to retract the document G which is being discharged from the sheet conveyance path 303.

To be specific, the discharging conveyance unit 334 is equipped with a pair of discharge rollers 334a, and a discharge roller driving unit (not shown) for rotationally driving the pair of discharge rollers 334a.

The pair of discharge rollers 334a is disposed downstream of the pair of downstream conveyance rollers 333 in the conveyance direction Y1, specifically, between the pair of downstream conveyance rollers 333 and the discharge tray 302. The pair of discharge rollers 334a convey the document G conveyed from the pair of downstream conveyance rollers 333 to the discharge tray 302. The pair of discharge rollers 334a also convey in a reverse conveyance direction Y2 opposite to the conveyance direction Y1 such that the trailing end (the upstream end in the conveyance direction Y1) of the document G becomes the leading end in the reverse conveyance direction Y2.

The discharge roller driving unit is configured to drive the pair of discharge rollers 334a to make a forward rotation, thereby conveying the document G in the conveyance direction Y1, and is also configured to drive the pair of discharge rollers 334a to make a reverse rotation, thereby conveying the document G in the reverse conveyance direction Y2 (switchback).

The sheet discharge path 304 is provided between the sheet conveyance path 303 and the pair of discharge rollers 334a.

The document feeding device 300 further includes a switchback conveyance path 305 defined between the first and second conveyance guide members 312a, 312b constituting the conveyance guide member 312. The document feeding device 300 allow to pass the document G retracted by the discharging conveyance unit 334 through the switchback conveyance path 305.

In this example, the sheet conveyance apparatus 330 is further equipped with a branching member 335. The branching member 335 is provided between an exit of the sheet conveyance path 303 and an entry of the switchback conveyance path 305.

The sheet discharge path 304 serves not only as a forward conveyance path for the document G conveyed by the forward rotation of the pair of discharge rollers 334a, but also as a reverse conveyance path for the document G conveyed by the reverse rotation of the pair of discharge rollers 334a.

The document G, conveyed by the pair of discharge rollers 334a such that the trailing end becomes the leading end, is guided by the branching member 335 into the switchback conveyance path 305. The switchback conveyance path 305 guides this document G toward the upstream side in the conveyance direction Y1, beyond the pair of registration rollers 331 in the sheet conveyance path 303. Thereby, the image reading device 200 can read both faces of the document G.

The branching member 335 is rotatable about a rotational axis extending in the width directions X of the document G which are orthogonal or substantially orthogonal to the conveyance direction Y1 of the document G.

To be specific, the branching member 335 is rotatably mounted on a rotation axis 330a which extends in the width directions X. Specifically, the branching member 335 has a substantially triangular shape in front view. The branching member 335 may be attachable to and detachable from the rotation axis 330a, and rotatable about the rotation axis 330a.

Regarding FIGS. 4 and 5, numbered constituent elements not mentioned above will be described later.

(Opening and Closing Detection of the Opening Closing Members)

The image forming apparatus 100 is equipped with detection units for detecting the operating state of the image forming apparatus 100. To be specific, the detection units are configured to detect whether the opening closing members (in this example, the opening closing guide member 311, the document feeding device 300, the paper feed trays 31, the opening closing cover member 113, and the opening closing guide member 114) are open or closed. In this example, the detection units include a first opening closing detection switch 340, a second opening closing detection switch 360, third opening closing detection switches 140, a fourth opening closing detection switch 160, and a fifth opening closing detection switch 180, as described below.

—First Opening Closing Detection Switch—

Figure 7:
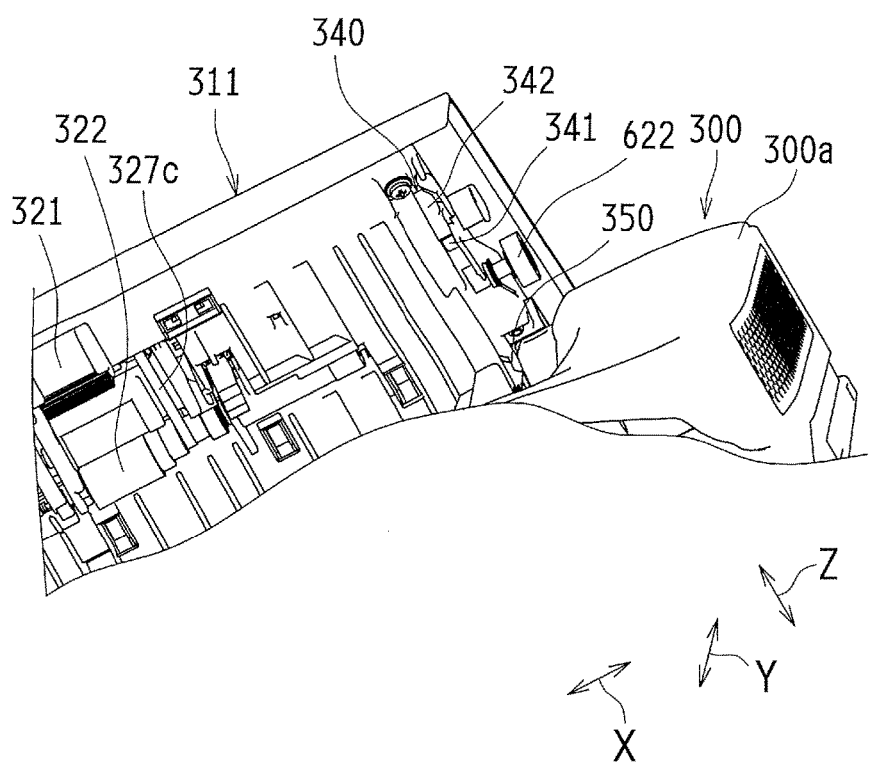
FIG. 7 is an illustration for explaining an actuated state of a first opening closing detection switch and a first actuation part, and is a side perspective view showing the first opening closing detection switch and the first actuation part, with the opening closing guide member being open from the document feeding device main body.

FIG. 7 is an illustration for explaining an actuated state of a first opening closing detection switch 340 and a first actuation part 350. FIG. 7 is a side perspective view showing the first opening closing detection switch 340 and the first actuation part 350, with the opening closing guide member 311 being open from the document feeding device main body 300a.

The document feeding device 300 is further equipped with a first opening closing detection switch 340 (an example of the detection unit) which detects whether the opening closing guide member 311 is open from or closed on the document feeding device main body 300a, and a first actuation part 350 (see also FIG. 4) for actuating the first opening closing detection switch 340.

The first opening closing detection switch 340 is provided on either one of the opening closing guide member 311 or the document feeding device main body 300a (in this example, the opening closing guide member 311), and the first actuation part 350 is provided on the other one of these (in this example, the document feeding device main body 300a). In this example, the first actuation part 350 is provided on the conveyance guide member 312 (see FIG. 4) in the document feeding device main body 300a. Specifically, the conveyance guide member 312 and the first actuation part 350 are integrally formed.

The first opening closing detection switch 340 and the first actuation part 350 are arranged such that, in the state where the opening closing guide member 311 is closed, the first opening closing detection switch 340 is turned on by the first actuation part 350 (namely, arranged to detect that the opening closing guide member 311 is closed). The first opening closing detection switch 340 and the first actuation part 350 are also arranged such that, in the state where the opening closing guide member 311 is open, either one of the first opening closing detection switch 340 or the first actuation part 350 (in this example, the first opening closing detection switch 340) moves away from the other one of these and thereby the first opening closing detection switch 340 is turned off (namely, arranged to detect that the opening closing guide member 311 is open). In this example, the first opening closing detection switch 340 and the first actuation part 350 are provided on a second side in the width directions X (specifically, the rear side) of the document feeding device 300.

The first opening closing detection switch 340 is a switch (specifically, a microswitch) composed of an actuator portion 341 swingable about an axis extending in the width directions X, and a switch portion 342. The switch portion 342 keeps an unactuated state (off state) when the actuator portion 341 receives no external force, and the switch portion 342 is turned into an actuated state (on state) when the actuator portion 341 receives an external force and makes a swinging movement. The first opening closing detection switch 340 may include a light transmission photosensor.

—Second Opening Closing Detection Switch—

Figure 8:
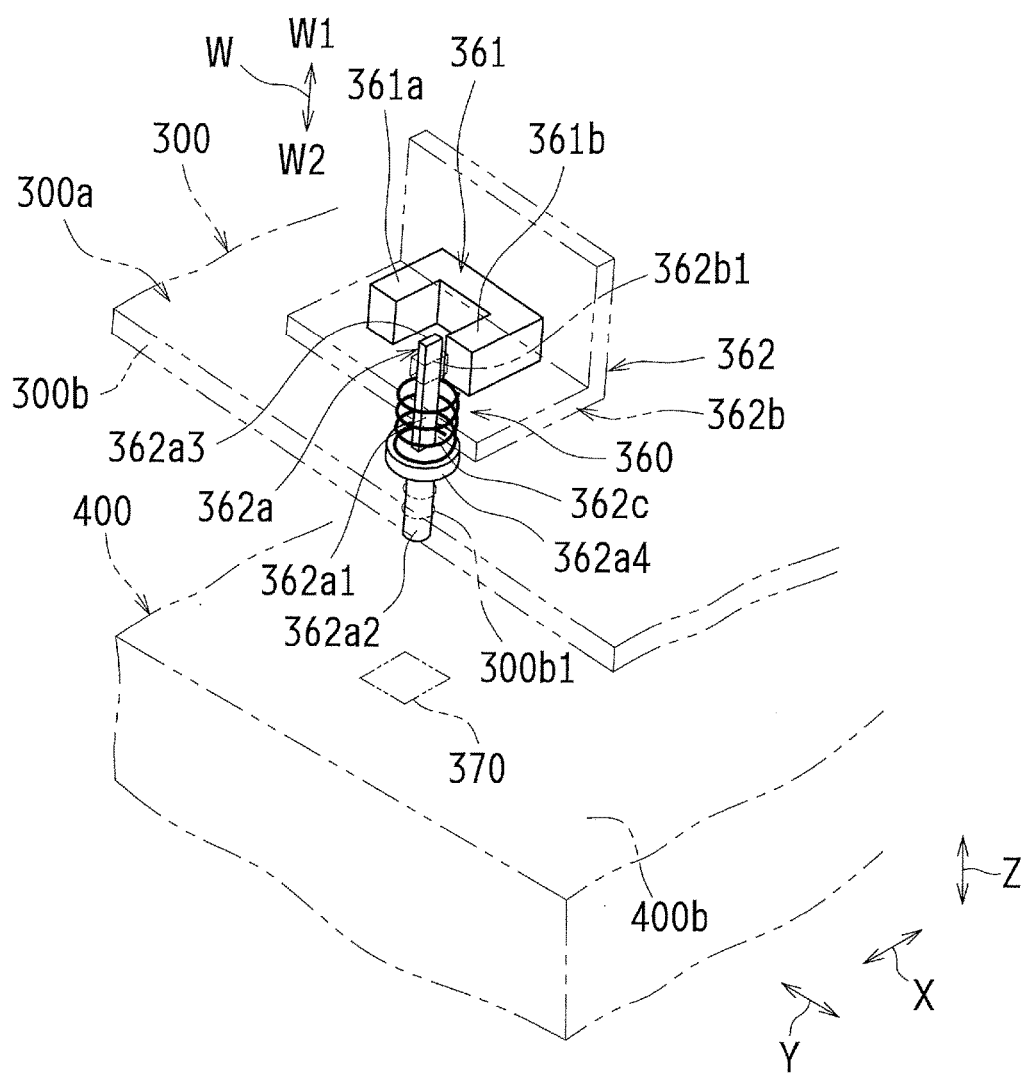
FIG. 8 is an illustration for explaining an actuated state of a second opening closing detection switch and a second actuation part, and is a front perspective view showing the second opening closing detection switch and the second actuation part, with the document feeding device being open from the document reading device.

FIG. 8 is an illustration for explaining an actuated state of a second opening closing detection switch 360 and a second actuation part 370. FIG. 8 is a front perspective view showing the second opening closing detection switch 360 and the second actuation part 370, with the document feeding device 300 being open from the document reading device 400.

The document feeding device 300 is further equipped with a second opening closing detection switch 360 (another example of the detection unit) (see also FIG. 5) which detects whether the document feeding device 300 is open from or closed on the document reading device 400, and a second actuation part 370 (see also FIG. 5) for actuating the second opening closing detection switch 360.

The second opening closing detection switch 360 is provided on either one of the document feeding device 300 or the document reading device 400 (in this example, the document feeding device 300), and the second actuation part 370 is provided on the other one of these (in this example, the document reading device 400). In this example, the second actuation part 370 is provided on a top cover 400b of the document reading device 400. Specifically, the top cover 400b and the second actuation part 370 are integrally formed.

The second opening closing detection switch 360 and the second actuation part 370 are arranged such that, in the state where the document feeding device 300 is closed, the second opening closing detection switch 360 is turned on by the second actuation part 370 (namely, arranged to detect that the document feeding device 300 is closed). The second opening closing detection switch 360 and the second actuation part 370 are also arranged such that, in the state where the document feeding device 300 is open, either one of the second opening closing detection switch 360 or the second actuation part 370 (in this example, the second opening closing detection switch 360) moves away from the other one of these and thereby the second opening closing detection switch 360 is turned off (namely, arranged to detect that the document feeding device 300 is open). In this example, the second opening closing detection switch 360 and the second actuation part 370 are provided on a first side in the width directions X (specifically, the front side) of the image reading device 200 and a second side in the crosswise directions Y (specifically, the left side) of the image reading device 200.

The second opening closing detection switch 360 is composed of a light transmission photosensor 361 having a light emitting part 361a for emitting light and a light receiving part 361b for receiving light emitted from the light emitting part 361a, and an actuator portion 362 which is switchable between the light blocking state where transmission of light from the light emitting part 361a to the light receiving part 361b is blocked and the light transmitting state where transmission of light from the light emitting part 361a to the light receiving part 361b is permitted.

While the document feeding device 300 is closed, the actuator portion 362 abuts on the second actuation part 370 to be in the light blocking state. While the document feeding device 300 is open, the actuator portion 362 is disengaged from the second actuation part 370 to be in the light transmitting state.

To be specific, the actuator portion 362 has a reciprocating member 362a which makes a reciprocating movement in reciprocating directions W which are orthogonal or substantially orthogonal to a bottom plate 300b of the document feeding device main body 300a.

The light transmission photosensor 361 is provided in the vicinity of a first said of the reciprocating member 362a in the reciprocating directions W.

The reciprocating member 362a has a main body portion 362a1, an abutment portion 362a2, and a light blocking portion 362a3. The main body portion 362a1 is a stick-like member extending in the reciprocating directions W. The abutment portion 362a2 is provided at an end portion of the main body portion 362a1 opposite to the light transmission photosensor 361 in the reciprocating directions W. The light blocking portion 362a3 is provided at an end portion of the main body portion 362a1 of the light transmission photosensor 361 side in the reciprocating directions W.

When the document feeding device 300 is closed, the abutment portion 362a2 abuts on the second actuation part 370 and moves in a first moving direction W1, toward the light transmission photosensor 361 in the reciprocating directions W. On the other hand, when the document feeding device 300 is opened, the abutment portion 362a2 is disengaged from the second actuation part 370 and moves in a second moving direction W2 opposite to the first moving direction W1.

When the document feeding device 300 is closed, the light blocking portion 362a3 is turned into the light blocking state by the movement of the abutment portion 362a2 in the first moving direction W1. On the other hand, when the document feeding device 300 is opened, the light blocking portion 362a3 is turned into the light transmitting state by the movement of the abutment portion 362a2 in the second moving direction W2.

Specifically, the actuator portion 362 further has a support plate 362b and a biasing member 362c.

The support plate 362b is fixed on the document feeding device main body 300a, above the bottom plate 300b of the document feeding device main body 300a and parallel or substantially parallel to the bottom plate 300b, with a predetermined gap therebetween. The support plate 362b supports the light transmission photosensor 361 on an upper surface of the support plate 362b. A through-hole 362b1 through which the light blocking portion 362a3 of the reciprocating member 362a penetrates is formed at a corresponding position between the light emitting part 361a and the light receiving part 361b. The size of the through-hole 362b1 is slightly (by a predetermined dimension) greater than that of the light blocking portion 362a3 so as to allow smooth insertion of the light blocking portion 362a3.

In addition, a through-hole 300b1 through which the abutment portion 362a2 of the reciprocating member 362a penetrates is formed at a position corresponding to the through-hole 362b1 in the bottom plate 300b of the document feeding device main body 300a. The size of the through-hole 300b1 is slightly (by a predetermined dimension) greater than that of the abutment portion 362a2 so as to allow smooth insertion of the abutment portion 362a2.

Owing to this configuration, the reciprocating member 362a is reciprocable in the reciprocating directions W.

The reciprocating member 362a further has a restriction portion 362a4 for restricting excessive movement of the main body portion 362a1 in the reciprocating directions W over a predetermined travel distance. The restriction portion 362a4 is provided at a central section of the main body portion 362a1 in the reciprocating directions W. In the state where the abutment portion 362a2 and the light blocking portion 362a3 penetrate through the through-hole 300b1 and the through-hole 362b1, respectively, the restriction portion 362a4 in the main body portion 362a1 is located between the support plate 362b and the bottom plate 300b of the document feeding device main body 300a. The restriction portion 362a4 has a greater size than the through-hole 300b1 and the through-hole 362b1. In this example, the restriction portion 362a4 has a disc-like shape, and is oriented parallel or substantially parallel to the support plate 362b and the bottom plate 300b. By this arrangement, the main body portion 362a1 can be prevented from excessive movement in the reciprocating directions W over a predetermined travel distance.

The reciprocating member 362a is biased in the second moving direction W2 by the biasing member 362c. In this example, the biasing member 362c is a general-purpose coil spring, mounted around the main body portion 362a1 between the support plate 362b and the restriction portion 362a4. Owing to this arrangement, the reciprocating member 362a can be biased in the second moving direction W2.

Alternatively, the actuator portion 362 may be arranged to abut on the second actuation part 370 to be in the light transmitting state while the document feeding device 300 is closed, and the actuator portion 362 may be disengaged from the second actuation part 370 to be in the light blocking state while the document feeding device 300 is open.

In the second opening closing detection switch 360, the light transmission photosensor 361 may be replaced with a microswitch.

—Third Opening Closing Detection Switch—

Figure 9A:
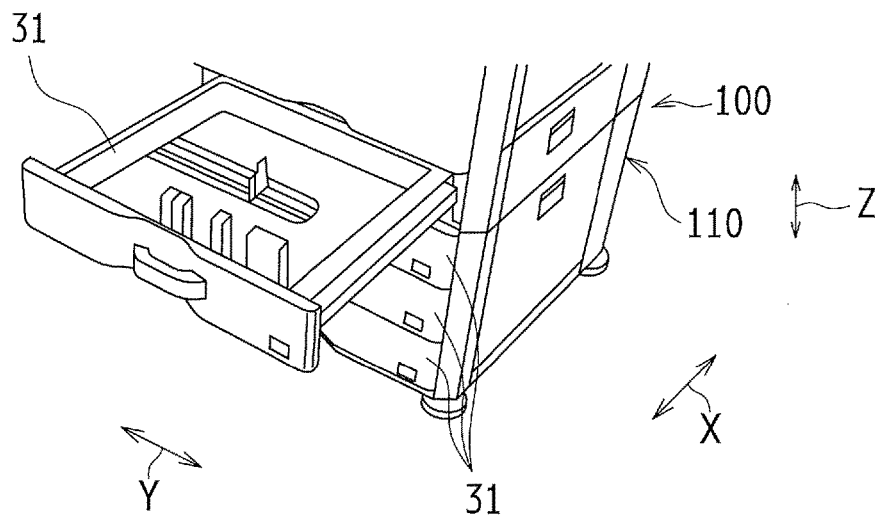
FIG. 9A is an illustration for explaining an actuated state of third opening closing detection switches and third actuation parts, and is a perspective view in which one of the paper feed trays is open from an image forming apparatus main body.
Figure 9B:
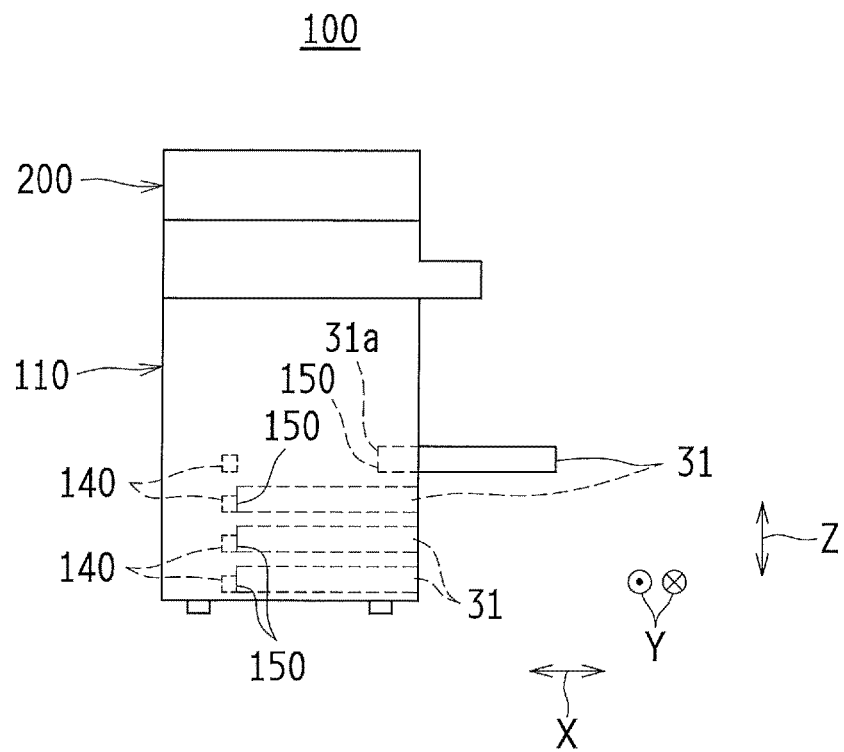
FIG. 9B is an illustration for explaining an actuated state of the third opening closing detection switches and the third actuation parts, and is a schematic side view in which the third opening closing detection switches detect whether the paper feed trays are open or closed.

FIGS. 9A and 9B are illustrations for explaining an actuated state of third opening closing detection switches 140 and third actuation parts 150. FIG. 9A is a perspective view in which one of the paper feed trays 31 is open from the image forming apparatus main body 110. FIG. 9B is a schematic side view in which the third opening closing detection switches 140 detect whether the paper feed trays 31 are open or closed.

The paper feed trays 31 are accommodated in the image forming apparatus main body 110, in a linearly reciprocable manner in predetermined linear directions (in this example, the width directions X).

The image forming apparatus main body 110 is further equipped with third opening closing detection switches 140 (still another example of the detection unit) (see FIG. 9B) which detect whether the paper feed trays 31 are open from or closed on the image forming apparatus main body 110, and third actuation parts 150 (see FIG. 9B) for actuating the third opening closing detection switches 140.

Each of the third opening closing detection switches 140 is provided on either one of the paper feed tray 31 or the image forming apparatus main body 110 (in this example, the image forming apparatus main body 110), and each of the third actuation parts 150 is provided on the other one of these (in this example, the paper feed tray 31). In this example, the third actuation parts 150 are provided on rear surfaces 31a (see FIG. 9B) of the paper feed trays 31. Specifically, each rear surface 31a and each third actuation part 150 are integrally formed.

Each of the third opening closing detection switches 140 and each of the third actuation parts 150 are arranged such that, in the state where the corresponding paper feed tray 31 is closed, the third opening closing detection switch 140 is turned on by the third actuation part 150 (namely, arranged to detect that the paper feed tray 31 is closed). Each of the third opening closing detection switches 140 and each of the third actuation parts 150 are also arranged such that, in the state where the corresponding paper feed tray 31 is open, either one of the third opening closing detection switch 140 or the third actuation part 150 (in this example, the third actuation part 150) moves away from the other one of these and thereby the third opening closing detection switch 140 is turned off (namely, arranged to detect that the paper feed tray 31 is open). In this example, the third opening closing detection switches 140 and the third actuation parts 150 are provided on a second side (specifically, the rear side) in the width directions X of the image forming apparatus main body 110.

The third opening closing detection switches 140 are microswitches in this example, but may include light transmission photosensors.

—Fourth Opening Closing Detection Switch—

Figure 10:
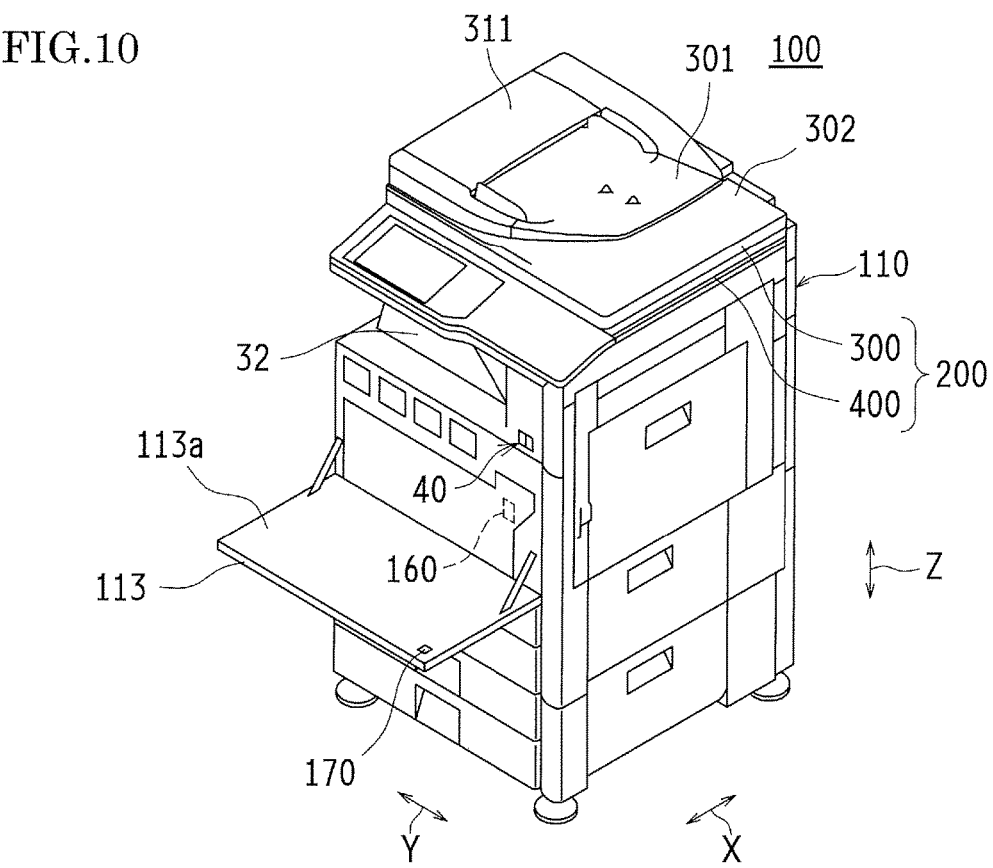
FIG. 10 is an illustration for explaining an actuated state of a fourth opening closing detection switch and a fourth actuation part, and is a perspective view in which an opening closing cover member is open from the image forming apparatus main body.

FIG. 10 is an illustration for explaining an actuated state of a fourth opening closing detection switch 160 and a fourth actuation part 170. FIG. 10 is a perspective view in which the opening closing cover member 113 is open from the image forming apparatus main body 110.

The opening closing cover member 113 is arranged on image forming apparatus main body 110, rotatably about a rotational axis extending in predetermined directions (in this example, the crosswise directions Y).

The image forming apparatus main body 110 is further equipped with a fourth opening closing detection switch 160 (yet another example of the detection unit) which detects whether the opening closing cover member 113 is open from or closed on the image forming apparatus main body 110, and a fourth actuation part 170 for actuating the fourth opening closing detection switch 160.

The fourth opening closing detection switch 160 is provided on either one of the opening closing cover member 113 or the image forming apparatus main body 110 (in this example, the image forming apparatus main body 110), and the fourth actuation part 170 is provided on the other one of these (in this example, the opening closing cover member 113). In this example, the fourth actuation part 170 is provided on an inner surface 113a of the opening closing cover member 113. Specifically, the inner surface 113a and the fourth actuation part 170 are integrally formed.

The fourth opening closing detection switch 160 and the fourth actuation part 170 are arranged such that, in the state where the opening closing cover member 113 is closed, the fourth opening closing detection switch 160 is turned on by the fourth actuation part 170 (namely, arranged to detect that the opening closing cover member 113 is closed). The fourth opening closing detection switch 160 and the fourth actuation part 170 are also arranged such that, in the state where the opening closing cover member 113 is open, either one of the fourth opening closing detection switch 160 or the fourth actuation part 170 (in this example, the fourth actuation part 170) moves away from the other one of these and thereby the fourth opening closing detection switch 160 is turned off (namely, arranged to detect that the opening closing cover member 113 is open). In this example, the fourth opening closing detection switch 160 and the fourth actuation part 170 are provided on a first side in the width directions X (specifically, the front side) of the image forming apparatus main body 110 and a first side in the crosswise direction Y (specifically, the right side) of the image forming apparatus main body 110.

The fourth opening closing detection switch 160 is a microswitch in this example, but may include a light transmission photosensor.

—Fifth Opening Closing Detection Switch—

Figure 11:
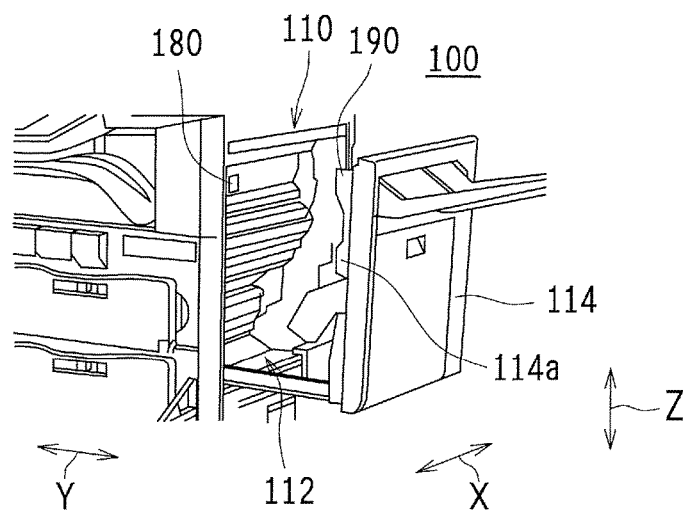
FIG. 11 is an illustration for explaining an actuated state of a fifth opening closing detection switch and a fifth actuation part, and is a perspective view in which the opening closing guide member is open from the image forming apparatus main body.

FIG. 11 is an illustration for explaining an actuated state of a fifth opening closing detection switch 180 and a fifth actuation part 190. FIG. 11 is a perspective view in which the opening closing guide member 114 is open from the image forming apparatus main body 110.

The opening closing guide member 114 is arranged on the image forming apparatus main body 110, in a linearly reciprocable manner in predetermined linear directions (in this example, the crosswise directions Y).

The image forming apparatus main body 110 is further equipped with a fifth opening closing detection switch 180 (further another example of the detection unit) which detects whether the opening closing guide member 114 is open from or closed on the image forming apparatus main body 110, and a fifth actuation part 190 for actuating the fifth opening closing detection switch 180.

The fifth opening closing detection switch 180 is provided on either one of the opening closing guide member 114 or the image forming apparatus main body 110 (in this example, the image forming apparatus main body 110), and the fifth actuation part 190 is provided on the other one of these (in this example, the opening closing guide member 114). In this example, the fifth actuation part 190 is provided on an inner member 114a of the opening closing guide member 114. Specifically, the inner member 114a and the fifth actuation part 190 are integrally formed.

The fifth opening closing detection switch 180 and the fifth actuation part 190 are arranged such that, in the state where the opening closing guide member 114 is closed, the fifth opening closing detection switch 180 is turned on by the fifth actuation part 190 (namely, arranged to detect that the opening closing guide member 114 is closed). The fifth opening closing detection switch 180 and the fifth actuation part 190 are also arranged such that, in the state where the opening closing guide member 114 is open, either one of the fifth opening closing detection switch 180 or the fifth actuation part 190 (in this example, the fifth actuation part 190) moves away from the other one of these and thereby the fifth opening closing detection switch 180 is turned off (namely, arranged to detect that the opening closing guide member 114 is open). In this example, the fifth opening closing detection switch 180 and the fifth actuation part 190 are provided on the first side in the width directions X (specifically, the front side) of the image forming apparatus main body 110.

The fifth opening closing detection switch 180 is a microswitch in this example, but may include a light transmission photosensor.

(Control Section)

Figure 12:
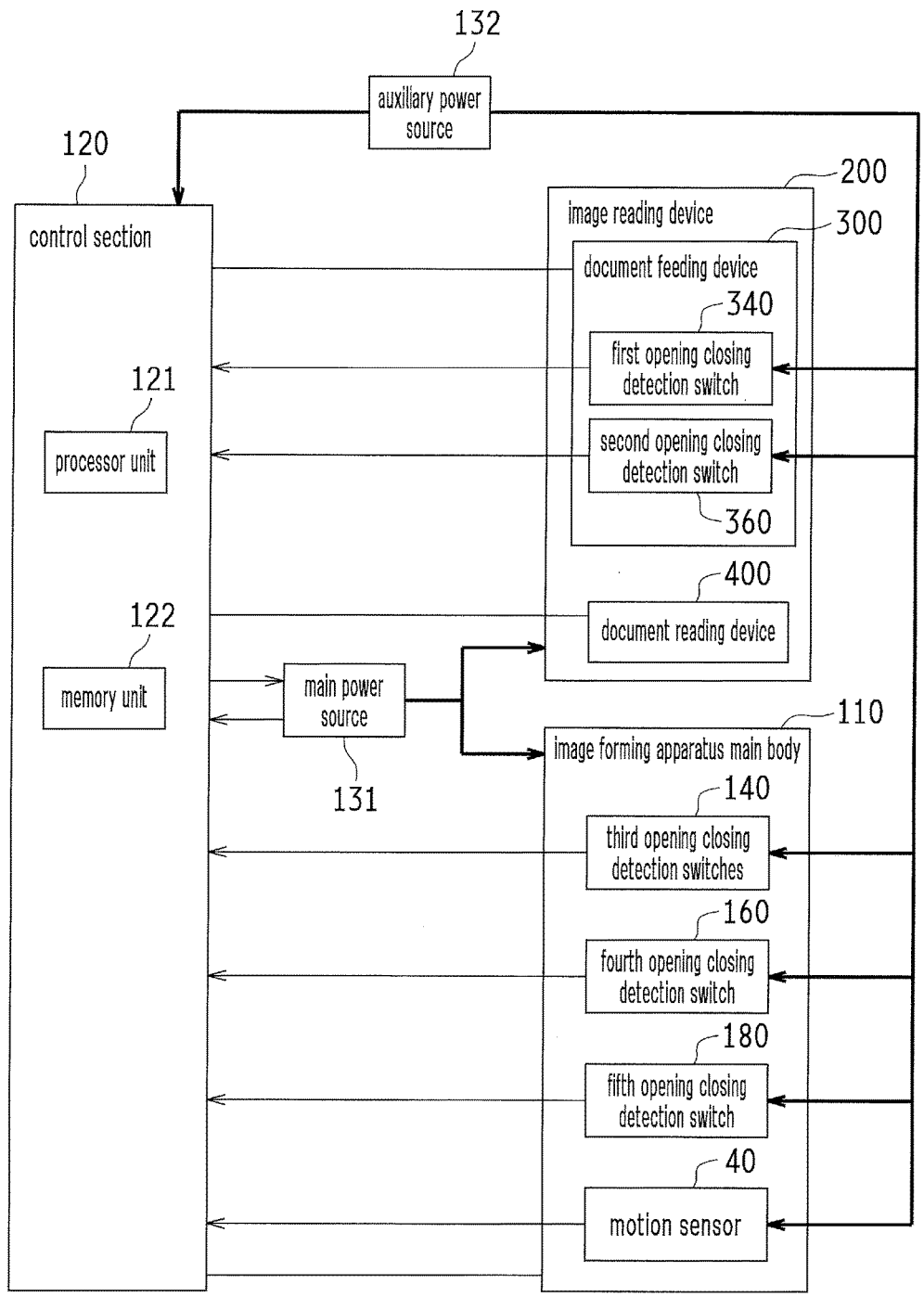
FIG. 12 is a system block diagram describing a configuration for detecting whether the opening closing members in the image forming apparatus are open or closed.

FIG. 12 is a system block diagram describing a configuration for detecting whether the opening closing members in the image forming apparatus 100 are open or closed.

The image forming apparatus 100 further has a control section 120 which controls the image forming apparatus 100 as a whole. Alternatively, the control section 120 may be provided in the image reading device 200.

The first opening closing detection switch 340 and the second opening closing detection switch 360 in the document feeding device 300 are electrically connected to the control section 120, and configured to send open/close detection signals of the opening closing guide member 311 and the document feeding device 300 to the control section 120. Therefore, by receiving closed signals from the first opening closing detection switch 340 and the second opening closing detection switch 360, the control section 120 can detect (recognize) that the opening closing guide member 311 and the document feeding device 300 are in the closed state, respectively. By receiving open signals from the first opening closing detection switch 340 and the second opening closing detection switch 360, the control section 120 can also detect (recognize) that the opening closing guide member 311 and the document feeding device 300 are in the open state, respectively. In this case, the closed signals indicate that the opening closing guide member 311 and the document feeding device 300 are closed, and the open signals indicate that the opening closing guide member 311 and the document feeding device 300 are open.

The third opening closing detection switches 140, the fourth opening closing detection switch 160, and the fifth opening closing detection switch 180 in the image forming apparatus main body 110 are electrically connected to the control section 120, and are configured to send open/close detection signals of the paper feed trays 31-31, the opening closing cover member 113, and the opening closing guide member 114 to the control section 120. Therefore, by receiving closed signals from the third opening closing detection switches 140, the fourth opening closing detection switch 160, and the fifth opening closing detection switch 180, the control section 120 can detect (recognize) that the paper feed trays 31-31, the opening closing cover member 113, and the opening closing guide member 114 are in the closed state, respectively. By receiving open signals from the third opening closing detection switches 140, the fourth opening closing detection switch 160, and fifth opening closing detection switch 180, the control section 120 can also detect (recognize) that the paper feed trays 31-31, the opening closing cover member 113, and the opening closing guide member 114 are in the open state, respectively. In this case, the closed signals indicate that the paper feed trays 31-31, the opening closing cover member 113, and the opening closing guide member 114 are closed, and the open signals indicate that the paper feed trays 31-31, the opening closing cover member 113, and the opening closing guide member 114 are open.

The image forming apparatus main body 110 is further equipped with a motion sensor 40 (see FIGS. 1 and 10) for detecting the presence of a person.

In this example, the motion sensor 40 is an ultrasonic motion sensor utilizing ultrasonic waves. The ultrasonic motion sensor 40 includes an ultrasonic emitter 41 (see FIG. 1) and an ultrasonic receiver 42 (see FIG. 1). The ultrasonic emitter 41 emits ultrasonic waves to a target in a predetermined detection range, and the ultrasonic receiver 42 receives reflected waves from the target. Based on the received detection result, the motion sensor 40 detects whether a target is present or absent. In this example, the motion sensor 40 is an ultrasonic motion sensor utilizing ultrasonic waves, but may also be an infrared motion sensor using infrared light, an optical motion sensor using visible light, or a combined motion sensor using at least two of ultrasonic waves, infrared light, and visible light.

The document feeding device 300 and the document reading device 400 in the image reading device 200 are electrically connected to the control section 120, and configured to perform an image reading operation (an image reading process) under the instruction of the control section 120.

The image forming apparatus main body 110 is electrically connected to the control section 120, and configured to perform an image forming operation (an image forming process) under the instruction of the control section 120.

The control section 120 has a power-saving mode in which the image forming apparatus 100 is switched from a predetermined normal power consumption state to a low power consumption state where less energy is supplied to the image forming apparatus 100 than in the predetermined normal power consumption state.

In this example, if one or more predetermined conditions are met (for example, if the image forming apparatus 100 remains in a standby state for a predetermined time without interruption, and/or, if the motion sensor 40 (see FIGS. 1 and 10) detects no person), the control section 120 is configured to turn the image forming apparatus 100 into the power-saving mode. The standby state in this example is an image forming operation standby state. In this context, the image forming operation standby state means the state where an image forming operation can start immediately; specifically, the state where a prescribed electric power for keeping the fixing apparatus 20 at a prescribed fixing temperature (e.g. 170° C.) required in the image forming operation is supplied to the fixing apparatus 20 in the image forming apparatus main body 110, thereby keeping the fixing temperature at the prescribed temperature (e.g. 170° C.) and also where the control section 120 has been started up. In this example, the low power consumption state in the power-saving mode means the state where a power-saving electric power for keeping the fixing apparatus 20 at a predetermined power-saving temperature (e.g. 150° C.) that is lower than the prescribed fixing temperature (e.g. 170° C.) required in the image forming operation is supplied to the fixing apparatus 20 in the image forming apparatus main body 110, and also where the control section 120 has been started up. Accordingly, in this example, the normal power consumption state means the standby state, and the low power consumption state means the state in the power-saving mode. It should be also noted that the low power consumption state in the power-saving mode encompasses the state (the standby state) where electric power is supplied only to the control section 120 and the detection units (in this example, the first opening closing detection switch 340, the second opening closing detection switch 360, the third opening closing detection switches 140, the fourth opening closing detection switch 160, the fifth opening closing detection switch 180, and the motion sensor 40).

In the power-saving mode, if one or more predetermined power-saving mode release conditions are met (for example, if a user effects a predetermined operation, and/or, if the motion sensor 40 detects a person), the control section 120 is configured to allow the image forming apparatus 100 to return from the low power consumption state in the power-saving mode to the normal power consumption state.

Specifically, as described in FIG. 12, the image forming apparatus 100 has a main power source 131 and an auxiliary power source 132 (an energy-saving power source).

The main power source 131 is electrically connected to the control section 120 by control system lines shown by thin lines, and is also electrically connected to the image forming apparatus main body 110 and the image reading device 200 by power system lines shown by thick lines.

The auxiliary power source 132 is electrically connected to the control section 120, the first opening closing detection switch 340, the second opening closing detection switch 360, the third opening closing detection switches 140, the fourth opening closing detection switch 160, the fifth opening closing detection switch 180, and the motion sensor 40, by power system lines shown by thick lines. The auxiliary power source 132 constantly supplies electric power to these elements.

The motion sensor 40 is electrically connected to an input system of the control section 120 by a control system line shown by a thin line, and is configured to send a signal indicating the presence or absence of a person to the control section 120. Based on a detection signal sent from the motion sensor 40, the control section 120 can detect (recognize) whether a person is present or absent.

To turn the image forming apparatus 100 into the standby state (specifically, the image forming operation standby state), the control section 120 is configured to send, to the main power source 131, an instruction signal for turning the image forming apparatus 100 into the standby state (specifically, the image forming operation standby state). To turn the image forming apparatus 100 into the power-saving mode, the control section 120 is configured to send, to the main power source 131, an instruction signal for turning the image forming apparatus 100 into the power-saving mode.

In the low power consumption state in the power-saving mode, the image forming apparatus 100 can supply electric power, by means of the auxiliary power source 132, only to the control section 120 and the detection units (in this example, the first opening closing detection switch 340, the second opening closing detection switch 360, the third opening closing detection switches 140, the fourth opening closing detection switch 160, the fifth opening closing detection switch 180, and the motion sensor 40).

Referring to FIG. 12, the control section 120 includes a processor unit 121 composed of a microcomputer such as a CPU (Central Processing Unit), and a memory unit 122 including a non-volatile memory such as a ROM (Read Only Memory), a volatile memory such as a RAM (Random Access Memory), or the like. The control section 120 is configured to control the operations of various constituent elements by allowing control programs prestored in the ROM in the memory unit 122 to be loaded and run on the RAM in the memory unit 122 by the processor unit 121. The RAM in the memory unit 122 provides an operational work area and an image memory area for storing image data to the processor unit 121.

In the image forming apparatus 100 described above, if one or more predetermined power-saving mode conditions are met (for example, if the image forming apparatus 100 remains in the standby state for a predetermined time without interruption, and/or, if the motion sensor 40 detects no person), the image forming apparatus 100 is turned into the power-saving mode. In the power-saving mode, if one or more power-saving mode release conditions are met (for example, if a user effects a predetermined operation, and/or, if the motion sensor 40 detects a person), the image forming apparatus 100 returns from the low power consumption state in the power-saving mode to the normal power consumption state (the standby state).

In the normal power consumption state (the standby state), the image forming apparatus 100 performs the image reading operation (the image reading process) and/or the image forming operation (the image forming process).

In the present embodiments, the drive motor 610, the first drive transmission gear 621, and the intermediate gear 623 shown in FIG. 6 are provided in the document feeding device main body 300a, whereas the second drive transmission gear 622, the drive axis 324, the torque limiter 325, the pivotable support member 326, the first one-way drive transmission mechanism 327, the second one-way drive transmission mechanism 328, the pick-up roller 321, and the sheet feeding roller 322 shown in FIG. 6 are provided in the opening closing guide member 311. In this configuration, when the opening closing guide member 311 is opened by a user, the second drive transmission gear 622 moves away from the intermediate gear 623 (see also FIG. 7), so that the pick-up roller 321 moves down from the raised position. The pick-up roller 321 may also move down due to vibration or the like resulting from the opening and closing operations of the opening closing guide member 311, the document feeding device 300, the paper feed trays 31, the opening closing cover member 113, and the opening closing guide member 114.

In the image forming apparatus 100, if the pick-up roller 321 has moved down unintentionally (for some reason) before a sheet (specifically, a document G) is set on the sheet placing portion (specifically, the document tray 301), it is difficult or even impossible to set a sheet on the sheet placing portion.

In order to solve these inconveniences, the image forming apparatus 100 executes control of an initial operation for a predetermined component (in this example, an initial operation of raising the pick-up roller 321 to the raised position), for example, at the start-up of the image forming apparatus 100 (including the reboot in the power-on state) or at the end of a job (a cycle of image forming operation). Further, with regard to the detection units (for example, the first opening closing detection switch 340, the second opening closing detection switch 360, the third opening closing detection switches 140, the fourth opening closing detection switch 160, and the fifth opening closing detection switch 180), when the detection results by the detection units indicate that any of the opening closing members (for example, the opening closing guide member 311, the document feeding device 300, the paper feed trays 31, the opening closing cover member 113, and the opening closing guide member 114) is open at first but closed later in the normal power consumption state, the image forming apparatus 100 also performs the initial operation (in this example, controls the initial operation of raising the pick-up roller 321 to the raised position, assuming that the pick-up roller 321 has moved down, or may have possibly moved down, from the raised position unintentionally due to an opening and closing operation of the opening closing member(s) by a user). In this example, the initial operation of raising the pick-up roller 321 to the raised position is defined as an operation of running the drive motor 610 for a predetermined time or cycles and then stopping the drive motor 610 such that the drive axis 324 is caused to rotate in the reverse direction S2 opposite to the rotational drive direction S1 and causes the pivotable support member 326 to pivot in the upward direction T2 until the pick-up roller 321 reaches the raised position.

The conventional image forming apparatus executes control of an initial operation to a certain component, as the control of the return operation for the image forming apparatus from the power-saving mode, also when the image forming apparatus returns from the low power consumption state in the power-saving mode to the normal power consumption state. In this case, when the image forming apparatus returns from the low power consumption state in the power-saving mode to the normal power consumption state, the conventional image forming apparatus constantly executes control of the initial operation, as the control of the return operation for the image forming apparatus from the power-saving mode, irrespective of whether the opening closing member is open or closed (namely, without detecting whether the opening closing member is open or closed in the power-saving mode).

As described, when the image forming apparatus returns from the low power consumption state in the power-saving mode to the normal power consumption state, the conventional image forming apparatus constantly executes control of the initial operation, as the control of the return operation for the image forming apparatus from the power-saving mode, irrespective of whether the opening closing member is open or closed. However, constant execution of the control of the return operation for the image forming apparatus from the power-saving mode entails various inconveniences: a user has to wait while control of the initial operation is executed; the noise of the initial operation for the component (in this example, the noise of raising the pick-up roller) is annoying to the user; or, if the image forming apparatus is configured to return from the low power consumption state in the power-saving mode to the normal power consumption state when the presence of a person is detected by a detection result by the motion sensor, control of the initial operation is triggered by mere approach of a user to the image forming apparatus, which makes the user frustrated.

(Control of the Return Operation for the Image Forming Apparatus from the Power-Saving Mode)

In this regard, the memory unit 122 in the present embodiments stores detection results by the detection units (in this example, the first opening closing detection switch 340, the second opening closing detection switch 360, the third opening closing detection switches 140, the fourth opening closing detection switch 160, and the fifth opening closing detection switch 180). The control section 120 causes the detection units to detect the operating state of the image forming apparatus 100 in the power-saving mode, and causes the memory unit 122 to store detection results by the detection units. To bring back the image forming apparatus 100 from the low power consumption state in the power-saving mode to the normal power consumption state, the control section 120 is configured to execute control of the return operation for the image forming apparatus 100 from the power-saving mode, based on the detection results by the detection units stored in the memory unit 122.

To be specific, the control section 120 causes the detection units (in this example, the first opening closing detection switch 340, the second opening closing detection switch 360, the third opening closing detection switches 140, the fourth opening closing detection switch 160, and the fifth opening closing detection switch 180) to detect the open/closed state of the opening closing members (in this example, the opening closing guide member 311, the document feeding device 300, the paper feed trays 31, the opening closing cover member 113, and the opening closing guide member 114) in the power-saving mode, and causes the memory unit 122 to store the open/closed state of the opening closing members based on the detection results by the detection units. When the image forming apparatus 100 is caused to return from the low power consumption state in the power-saving mode to the normal power consumption state, if detection of the open/closed state of any of the opening closing members in the power-saving mode is indicated by the detection results by the detection units stored in the memory unit 122, the control section 120 executes control of the initial operation for the component, as the control of the return operation for the image forming apparatus 100 from the power-saving mode. On the other hand, if non-detection of the open/closed state of the opening closing members in the power-saving mode is indicated by the detection results by the detection units stored in the memory unit 122, the control section 120 does not execute control of the initial operation, as the control of the return operation for the image forming apparatus 100 from the power-saving mode.

First Embodiment

In First Embodiment, the control section 120 causes one of the detection units (specifically, the first opening closing detection switch 340) to detect the open/closed state of the corresponding one of the opening closing members (specifically, the opening closing guide member 311), in the normal power consumption state (specifically, the standby state) and in the power-saving mode.

In the normal power consumption state, if the control section 120 detects that the opening closing member (specifically, the opening closing guide member 311) is open at first but closed later, based on the detection result by the detection unit (specifically, the first opening closing detection switch 340), then the control section 120 executes control of the initial operation of raising the pick-up roller 321 to the raised position.

In the power-saving mode, the control section 120 causes the memory unit 122 to store the open/closed state of the opening closing member (specifically, the opening closing guide member 311), based on the detection result by the detection unit (specifically, the first opening closing detection switch 340).

When the image forming apparatus is caused to return from the low power consumption state in the power-saving mode to the normal power consumption state, if detection of the open/closed state of the opening closing member (specifically, the opening closing guide member 311) in the power-saving mode is indicated by the detection result by the detection unit (specifically, the first opening closing detection switch 340) stored in the memory unit 122, the control section 120 executes control of the initial operation for the pick-up roller 321, as the control of the return operation for the image forming apparatus 100 from the power-saving mode.

On the other hand, when the image forming apparatus is caused to return from the low power consumption state in the power-saving mode to the normal power consumption state, if non-detection of the open/closed state of the opening closing member (specifically, the opening closing guide member 311) in the power-saving mode is indicated by the detection result by the detection unit (specifically, the first opening closing detection switch 340) stored in the memory unit 122, the control section 120 does not execute control of the initial operation for the pick-up roller 321, as the control of the return operation for the image forming apparatus 100 from the power-saving mode.

Second Embodiment

In Second Embodiment, the control section 120 causes one of the detection units (specifically, the second opening closing detection switch 360) to detect the open/closed state of the corresponding one of the opening closing members (specifically, the document feeding device 300), in the normal power consumption state (specifically, the standby state) and in the power-saving mode.

In the normal power consumption state, if the control section 120 detects that the opening closing member (specifically, the document feeding device 300) is open at first but closed later, based on the detection result by the detection unit (specifically, the second opening closing detection switch 360), then the control section 120 executes control of the initial operation of raising the pick-up roller 321 to the raised position.

In the power-saving mode, the control section 120 causes the memory unit 122 to store the open/closed state of the opening closing member (specifically, the document feeding device 300), based on the detection result by the detection unit (specifically, the second opening closing detection switch 360).

When the image forming apparatus is caused to return from the low power consumption state in the power-saving mode to the normal power consumption state, if detection of the open/closed state of the opening closing member (specifically, the document feeding device 300) in the power-saving mode is indicated by the detection result by the detection unit (specifically, the second opening closing detection switch 360) stored in the memory unit 122, the control section 120 executes control of the initial operation for the pick-up roller 321, as the control of the return operation for the image forming apparatus 100 from the power-saving mode.

On the other hand, when the image forming apparatus is caused to return from the low power consumption state in the power-saving mode to the normal power consumption state, if non-detection of the open/closed state of the opening closing member (specifically, the document feeding device 300) in the power-saving mode is indicated by the detection result by the detection unit (specifically, the second opening closing detection switch 360) stored in the memory unit 122, the control section 120 does not execute control of the initial operation for the pick-up roller 321, as the control of the return operation for the image forming apparatus 100 from the power-saving mode.

Third Embodiment

In Third Embodiment, the control section 120 causes some of the detection units (specifically, the third opening closing detection switches 140) to detect the open/closed state of corresponding ones of the opening closing members (specifically, the paper feed trays 31), in the normal power consumption state (specifically, the standby state) and in the power-saving mode.

In the normal power consumption state, if the control section 120 detects that any of the opening closing members (specifically, the paper feed trays 31) is open at first but closed later, based on the detection results by the detection units (specifically, the third opening closing detection switches 140), then the control section 120 executes control of the initial operation of raising the pick-up roller 321 to the raised position.

In the power-saving mode, the control section 120 causes the memory unit 122 to store the open/closed state of the opening closing members (specifically, the paper feed trays 31), based on the detection results by the detection units (specifically, the third opening closing detection switches 140).

When the image forming apparatus is caused to return from the low power consumption state in the power-saving mode to the normal power consumption state, if detection of the open/closed state of any of the opening closing members (specifically, the paper feed trays 31) in the power-saving mode is indicated by the detection results by the detection units (specifically, the third opening closing detection switches 140) stored in the memory unit 122, the control section 120 executes control of the initial operation for the pick-up roller 321, as the control of the return operation for the image forming apparatus 100 from the power-saving mode.

On the other hand, when the image forming apparatus is caused to return from the low power consumption state in the power-saving mode to the normal power consumption state, if non-detection of the open/closed state of any of the opening closing members (specifically, the paper feed trays 31) in the power-saving mode is indicated by the detection results by the detection units (specifically, the third opening closing detection switches 140) stored in the memory unit 122, the control section 120 does not execute control of the initial operation for the pick-up roller 321, as the control of the return operation for the image forming apparatus 100 from the power-saving mode.

Fourth Embodiment

In Fourth Embodiment, the control section 120 causes one of the detection units (specifically, the fourth opening closing detection switch 160) to detect the open/closed state of the corresponding one of the opening closing members (specifically, the opening closing cover member 113), in the normal power consumption state (specifically, the standby state) and in the power-saving mode.

In the normal power consumption state, if the control section 120 detects that the opening closing member (specifically, the opening closing cover member 113) is open at first but closed later, based on the detection result by the detection unit (specifically, the fourth opening closing detection switch 160), then the control section 120 executes control of the initial operation of raising the pick-up roller 321 to the raised position.

In the power-saving mode, the control section 120 causes the memory unit 122 to store the open/closed state of the opening closing member (specifically, the opening closing cover member 113), based on the detection result by the detection unit (specifically, the fourth opening closing detection switch 160).

When the image forming apparatus is caused to return from the low power consumption state in the power-saving mode to the normal power consumption state, if detection of the open/closed state of the opening closing member (specifically, the opening closing cover member 113) in the power-saving mode is indicated by the detection result by the detection unit (specifically, the fourth opening closing detection switch 160) stored in the memory unit 122, the control section 120 executes control of the initial operation for the pick-up roller 321, as the control of the return operation for the image forming apparatus 100 from the power-saving mode.

On the other hand, when the image forming apparatus is caused to return from the low power consumption state in the power-saving mode to the normal power consumption state, if non-detection of the open/closed state of the opening closing member (specifically, the opening closing cover member 113) in the power-saving mode is indicated by the detection result by the detection unit (specifically, the fourth opening closing detection switch 160) stored in the memory unit 122, the control section 120 does not execute control of the initial operation for the pick-up roller 321, as the control of the return operation for the image forming apparatus 100 from the power-saving mode.

Fifth Embodiment

In Fifth Embodiment, the control section 120 causes one of the detection units (specifically, the fifth opening closing detection switch 180) to detect the open/closed state of the corresponding one of the opening closing members (specifically, the opening closing guide member 114), in the normal power consumption state (specifically, the standby state) and in the power-saving mode.

In the normal power consumption state, if the control section 120 detects that the opening closing member (specifically, the opening closing guide member 114) is open at first but closed later, based on the detection result by the detection unit (specifically, the fifth opening closing detection switch 180), then the control section 120 executes control of the initial operation of raising the pick-up roller 321 to the raised position.

In the power-saving mode, the control section 120 causes the memory unit 122 to store the open/closed state of the opening closing member (specifically, the opening closing guide member 114), based on the detection result by the detection unit (specifically, the fifth opening closing detection switch 180).

When the image forming apparatus is caused to return from the low power consumption state in the power-saving mode to the normal power consumption state, if detection of the open/closed state of the opening closing member (specifically, the opening closing guide member 114) in the power-saving mode is indicated by the detection result by the detection unit (specifically, the fifth opening closing detection switch 180) stored in the memory unit 122, the control section 120 executes control of the initial operation for the pick-up roller 321, as the control of the return operation for the image forming apparatus 100 from the power-saving mode.

On the other hand, when the image forming apparatus is caused to return from the low power consumption state in the power-saving mode to the normal power consumption state, if non-detection of the open/closed state of the opening closing member (specifically, the opening closing guide member 114) in the power-saving mode is indicated by the detection result by the detection unit (specifically, the fifth opening closing detection switch 180) stored in the memory unit 122, the control section 120 does not execute control of the initial operation for the pick-up roller 321, as the control of the return operation for the image forming apparatus 100 from the power-saving mode.

In First to Fifth Embodiments, the low power consumption state in the power-saving mode include the standby state.

(Closed Information and Open Information on the Opening Closing Members)

Figure 13:
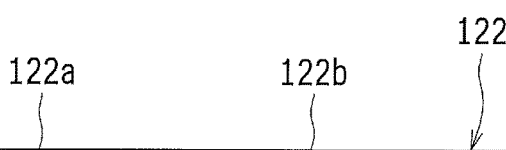
FIG. 13 is a schematic diagram schematically describing closed information and open information on the opening closing members to be stored in a memory unit.

FIG. 13 is a schematic diagram schematically describing closed information and open information on the opening closing members to be stored in the memory unit 122.

(1) Execution of the Control of the Initial Operation (Detection of the Open/Closed State)

Regarding First to Fifth Embodiments, detection of the open/closed state of the opening closing members (in this example, the opening closing guide member 311, the document feeding device 300, the paper feed trays 31, the opening closing cover member 113, and the opening closing guide member 114) in the power-saving mode can be described by way of following examples.

Case (1-1): The opening closing member is closed at the start of the power-saving mode, opened later and closed thereafter in the power-saving mode. In this case, the memory unit 122 stores closed information (for example, "1") in a first storage area 122a for use to represent the state at the start of the power-saving mode, and stores open information (for example, "0") and closed information (for example, "1") in this order in a second storage area 122b for use to represent the state in the power-saving mode.

Case (1-2): The opening closing member is open at the start of the power-saving mode, and closed later in the power-saving mode. In this case, the memory unit 122 stores open information (for example, "0") in the first storage area 122a, and stores closed information (for example, "1") in the second storage area 122b.

In either of Case (1-1) or Case (1-2), the control section 120 executes control of the initial operation for the pick-up roller 321.

(2) Non-Execution of the Control of the Initial Operation (Non-Detection of the Open/Closed State)

Non-detection of the open/closed state of the opening closing members (in this example, the opening closing guide member 311, the document feeding device 300, the paper feed trays 31, the opening closing cover member 113, and the opening closing guide member 114) in the power-saving mode can be described by way of following examples.

Case (2-1): The opening closing member is closed at the start of the power-saving mode, and remains closed in the power-saving mode. In this case, the memory unit 122 stores closed information (for example, "1") in the first storage area 122a, and stores closed information (for example, "1") in the second storage area 122b.

Case (2-2): The opening closing member is open at the start of the power-saving mode, and remains open in the power-saving mode. In this case, the memory unit 122 stores open information (for example, "0") in the first storage area 122a, and stores open information (for example, "0") in the second storage area 122b.

Case (2-3) The opening closing member is closed at the start of the power-saving mode, and opened later and remains open in the power-saving mode. In this case, the memory unit 122 stores closed information (for example, "1") in the first storage area 122a, and stores open information (for example, "0") in the second storage area 122b.

In any of Cases (2-1) to (2-3), the control section 120 does not execute control of the initial operation for the pick-up roller 321.

However, in Case (2-3), control of the initial operation may be performed, depending on the configuration of the image forming apparatus 100 or the type of the opening closing member to be detected.

(Examples of Controlling the Initial Operation)
—Normal Power Consumption State—

Figure 14:
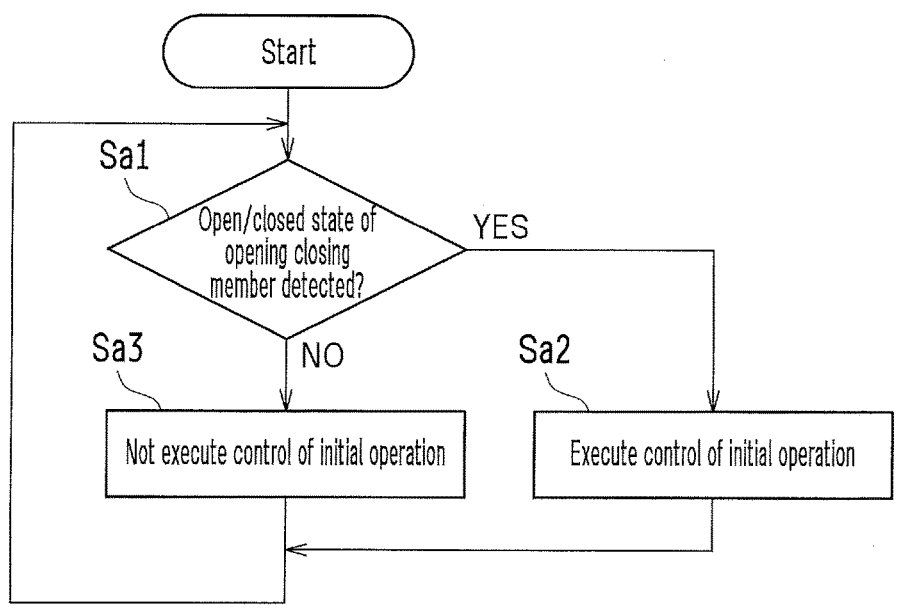
FIG. 14 is a flowchart describing an exemplary control of an initial operation in the normal power consumption state, regarding First to Fifth Embodiments.

FIG. 14 is a flowchart describing an exemplary control of the initial operation in the normal power consumption state, regarding First to Fifth Embodiments.

In the normal power consumption state, as shown in FIG. 14, the control section 120 judges whether any of the detection units (in this example, the first opening closing detection switch 340, the second opening closing detection switch 360, the third opening closing detection switch 140, the fourth opening closing detection switch 160, and the fifth opening closing detection switch 180) has detected the open/closed state of the corresponding opening closing member (in this example, the opening closing guide member 311, the document feeding device 300, the paper feed trays 31, the opening closing cover member 113, or the opening closing guide member 114) as being open at first and closed later (Step Sa1).

If detection of the open/closed state of the opening closing member is confirmed (Yes in Step Sa1), the control section 120 executes control of the initial operation for the pick-up roller 321 (Step Sa2), and the process goes back to Step Sa1.

If non-detection of the open/closed state of the opening closing member is confirmed (No in Step Sa1), the control section 120 does not execute control of the initial operation for the pick-up roller 321 (Step Sa3), and the process goes back to Step Sa1.

—Power-Saving Mode—

Figure 15:
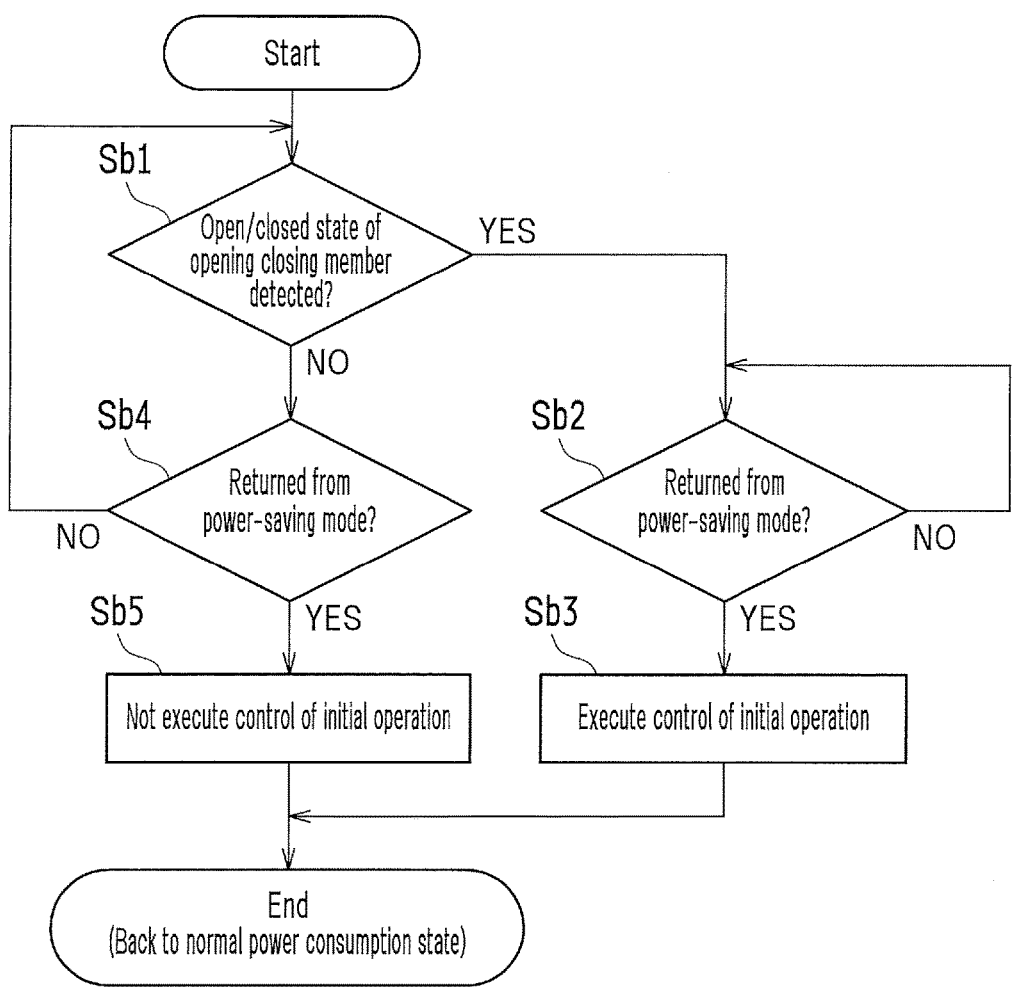
FIG. 15 is a flowchart describing an exemplary control of an initial operation in the power-saving mode, regarding First to Fifth Embodiments.

FIG. 15 is a flowchart describing an exemplary control of the initial operation in the power-saving mode, regarding First to Fifth Embodiments.

In the power-saving mode, as shown in FIG. 15, the control section 120 judges whether any of the detection units (in this example, the first opening closing detection switch 340, the second opening closing detection switch 360, the third opening closing detection switches 140, the fourth opening closing detection switch 160, and the fifth opening closing detection switch 180) has detected the open/closed state of the corresponding opening closing member (in this example, the opening closing guide member 311, the document feeding device 300, the paper feed trays 31, the opening closing cover member 113, or the opening closing guide member 114) (Step Sb1).

If detection of the open/closed state of the opening closing member is confirmed (Yes in Step Sb1), the control section 120 waits until the image forming apparatus 100 returns from the low power consumption state in the power-saving mode to the normal power consumption state (No in Step Sb2). When the image forming apparatus 100 has returned from the low power consumption state in the power-saving mode to the normal power consumption state (Yes in Step Sb2), the control section 120 executes control of the initial operation for the pick-up roller 321 (Step Sb3), and ends the process (the image forming apparatus 100 is switched into the normal power consumption state).

If non-detection of the open/closed state of the opening closing member is confirmed (No in Step Sb1), the control section 120 judges whether the image forming apparatus 100 has returned from the low power consumption state in the power-saving mode to the normal power consumption state (Step Sb4).

If the control section 120 has judged that the image forming apparatus 100 has not returned from the low power consumption state in the power-saving mode to the normal power consumption state (No in Step Sb4), the process goes back to Step Sb1. If the control section 120 has judged that the image forming apparatus 100 has returned from the low power consumption state in the power-saving mode to the normal power consumption state (Yes in Step Sb4), the control section 120 does not execute control of the initial operation for the pick-up roller 321 (Step Sb5), and ends the process (the image forming apparatus 100 is switched into the normal power consumption state).

Other Embodiments

In the above-described embodiments, the component is the pick-up roller 321 provided in the document feeding device 300. However, as long as the component is used for the control for the return operation for the image forming apparatus 100 from the power-saving mode, the component may be anything.

The Present Embodiments

The image forming apparatus 100 as above described includes the detection units (in the present embodiments, the first opening closing detection switch 340, the second opening closing detection switch 360, the third opening closing detection switches 140, the fourth opening closing detection switch 160, and the fifth opening closing detection switch 180) which detect the operating state of the image forming apparatus 100, and the memory unit 122 for storing the detection results by the detection units. In the power-saving mode, the operating state of the image forming apparatus 100 is detected by the detection units, and the detection results by the detection units are stored in the memory unit 122. When the image forming apparatus 100 returns from the low power consumption state in the power-saving mode to the normal power consumption state, control of the return operation for the image forming apparatus 100 from the power-saving mode is executed, based on the detection results by the detection units stored in the memory unit 122. Owing to this configuration, the control of the return operation for the image forming apparatus 100 from the power-saving mode can be inhibited, depending on the detection results by the detection units stored in the memory unit 122. Accordingly, when the image forming apparatus 100 returns from the low power consumption state in the power-saving mode to the normal power consumption state, it is possible to avoid the conventional inconveniences associated with constant execution of control of the return operation for the image forming apparatus 100 from the power-saving mode. Besides, since the operating state of the image forming apparatus 100 in the power-saving mode is detected by the detection units and the detection results by the detection units are stored in the memory unit 122, control of the return operation for the image forming apparatus 100 from the power-saving mode can be certainly executed, based on the operating state of the image forming apparatus 100 in the power-saving mode.

Also in the present embodiments, when the image forming apparatus 100 returns from the low power consumption state in the power-saving mode to the normal power consumption state, if detection of the open/closed state of any of the opening closing members (in the present embodiments, the opening closing guide member 311, the document feeding device 300, the paper feed trays 31, the opening closing cover member 113, and the opening closing guide member 114) in the power-saving mode is indicated by the detection results by the detection units (in the present embodiments, the first opening closing detection switch 340, the second opening closing detection switch 360, the third opening closing detection switches 140, the fourth opening closing detection switch 160, and the fifth opening closing detection switch 180) stored in the memory unit 122, control of the initial operation for the component is executed as the control of the return operation for the image forming apparatus 100 from the power-saving mode. On the other hand, if non-detection of the open/closed state of the opening closing member in the power-saving mode is indicated by the detection results by the detection units stored in the memory unit 122, control of the initial operation is not executed as the control of the return operation for the image forming apparatus 100 from the power-saving mode. This arrangement can eliminate an unnecessary control of the initial operation. Accordingly, it is possible to avoid the inconveniences associated with constant control of the return operation for the image forming apparatus 100 from the power-saving mode (for example, a user has to wait while control of the initial operation is executed; the noise generated by the initial operation for the component is annoying to the user; or, if the image forming apparatus 100 is configured to return from the low power consumption state in the power-saving mode to the normal power consumption state when the motion sensor 40 detects a person, as in the present embodiments, control of the initial operation is triggered by mere approach of a user to the image forming apparatus 100, which makes the user frustrated).

In the present embodiments, when any of the detection units (for example, the first opening closing detection switch 340, the second opening closing detection switch 360, the third opening closing detection switches 140, the fourth opening closing detection switch 160, and the fifth opening closing detection switch 180) detects the open/closed state of the corresponding opening closing member (for example, the opening closing guide member 311, the document feeding device 300, the paper feed trays 31, the opening closing cover member 113, or the opening closing guide member 114) in the normal power consumption state, if the detection results by the detection units indicate that any of the opening closing members is open at first but closed later, control of the initial operation is executed. In this manner, control of the initial operation in the normal power consumption state can be certainly executed.

Further in the present embodiments, the initial operation is an operation for raising the pick-up roller 321 to the raised position. This arrangement can eliminate an unnecessary control of the initial operation (in this example, control of raising the pick-up roller 321), based on an assumption that the opening closing member has not been opened or closed by a user in the power-saving mode and that the pick-up roller 321 has not moved down from the raised position.

Still further, the image forming apparatus 100 according to the present embodiments is provided with the image reading device 200 having a moving document reading configuration. The image reading device 200 is provided with the document feeding device 300 having the pick-up roller 321. The opening closing member (in this example, the opening closing guide member 311) is openable from and closable on the document feeding device main body 300a, and is equipped with the pick-up roller 321. When the image forming apparatus 100 returns from the low power consumption state in the power-saving mode to the normal power consumption state, and if, in the power-saving mode, non-detection of the open/closed state of the corresponding opening closing member (in this example, the opening closing guide member 311) is indicated by the detection result by the detection unit (in this example, the first opening closing detection switch 340) stored in the memory unit 122, this arrangement can inhibit execution of the control of the initial operation, and can thereby eliminate an unnecessary initial operation, based on an assumption that the opening closing member (in this example, the opening closing guide member 311) has not been opened or closed by a user and that the pick-up roller 321 has not moved down from the raised position.

Furthermore, the image forming apparatus 100 according to the present embodiments is provided with the image reading device 200 having a moving document reading configuration and a stationary document reading configuration. The image reading device 200 is provided with the document feeding device 300 having the pick-up roller 321, and the document reading device 400 having the document placement stand 410. The opening closing member is the document feeding device 300 which is openable from and closable on the document reading device 400 and, when closed, which holds down the document G placed on the document placement stand 410. When the image forming apparatus 100 returns from the low power consumption state in the power-saving mode to the normal power consumption state, and if, in the power-saving mode, non-detection of the open/closed state of the document feeding device 300 is indicated by the detection result by the detection unit (in this example, the second opening closing detection switch 360) stored in the memory unit 122, this arrangement can inhibit execution of the control of the initial operation, and can thereby eliminate an unnecessary initial operation, based on an assumption that the document feeding device 300 has not been opened or closed by a user and that the pick-up roller 321 has not moved down from the raised position.

The present invention should not be limited to the above-described embodiments, but can be embodied and practiced in other different forms. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An image forming apparatus having a power-saving mode in which the image forming apparatus is switched from a predetermined normal power consumption state to a low power consumption state where less energy is supplied than in the normal power consumption state, the image forming apparatus comprising:
a control section;
an opening closing member that is openable and closable; and an opening closing member detection switch that detects whether the opening closing member is opened or closed, wherein when the image forming apparatus returns from the low power consumption state in the power-saving mode to the normal power consumption state after the opening closing member detection switch detects and opening action or a closing action of the opening closing member in the power-saving mode, the control section controls an initial operation for a movable component of the image forming apparatus, and wherein, when the image forming apparatus returns from the low power consumption state in the power-saving mode to the normal power consumption state after the opening closing member detection switch does not detect an opening action or a closing action of the opening closing member in the power-saving mode, the control section does not control the initial operation for the movable component.

2. The image forming apparatus according to claim 1, wherein the opening closing member detection switch detects an opening action or a closing action of the opening closing member in the normal power consumption state, and wherein the control section controls the initial operation if a detection result by the opening closing member detection switch indicates that detection of the opening action of the opening closing member is followed by detection of the closing action of the opening closing member.

3. The image forming apparatus according to claim 1, further comprising:

a sheet placing portion that places one or more sheets; and a sheet feeding apparatus including a pick-up roller, the pick-up roller being configured to be capable of moving up and down and to feed the one or more sheets placed on the sheet placing portion, one by one, by moving down from a raised position, wherein the initial operation is an operation for raising the pick-up roller at the raised position.

4. The image forming apparatus according to claim 3, further comprising an image reading device having a moving document reading configuration in which an image on a document, as the sheet, is read while the document is caused to move, wherein the image reading device comprises a document feeding device having the pick-up roller, and wherein the opening closing member is openable from and closable on a document feeding device main body, and is equipped with the pick-up roller.

5. The image forming apparatus according to claim 3, further comprising an image reading device having a moving document reading configuration in which an image on a document is read while the document, as the sheet, is caused to move, and a stationary document reading configuration in which an image of a document is read while the document, as the sheet, is placed on a document placement stand, wherein the image reading device comprises a document feeding device having the pick-up roller, and a document reading device having the document placement stand, and wherein the opening closing member is the document feeding device which is openable from and closable on the document reading device and, when closed, which holds down the document placed on the document placement stand.

* * * * *